(12) United States Patent
Yokozawa et al.

(10) Patent No.: US 6,570,723 B2
(45) Date of Patent: May 27, 2003

(54) MAGNETIC CARD READER AND MAGNETIC DATA REPRODUCTION METHOD, DATA DEMODULATION METHOD AND DEMODULATOR OF MAGNETIC RECORD DATA

(75) Inventors: Mitsuo Yokozawa, Nagano (JP); Hiroshi Nakamura, Nagano (JP); Shinya Morozumi, Nagano (JP); Keiji Hoson, Nagano (JP)

(73) Assignee: Kabushiki Kaisha Sankyo Seiki Seisakusho, Nagano (JP)

( * ) Notice: Subject to any disclaimer, the term of this patent is extended or adjusted under 35 U.S.C. 154(b) by 0 days.

(21) Appl. No.: 10/144,040

(22) Filed: May 14, 2002

(65) Prior Publication Data

US 2002/0191312 A1 Dec. 19, 2002

Related U.S. Application Data

(62) Division of application No. 09/767,840, filed on Jan. 24, 2001.

(30) Foreign Application Priority Data

| Jan. 24, 2000 | (JP) | 2000-015010 |
| Jun. 15, 2000 | (JP) | 2000-179431 |
| Oct. 24, 2000 | (JP) | 2000-324439 |
| Nov. 7, 2000 | (JP) | 2000-338901 |

(51) Int. Cl.⁷ .......................... G11B 25/04; G11B 5/02; G11B 5/09
(52) U.S. Cl. ..................... 360/2; 360/29; 360/39; 235/449
(58) Field of Search ................ 360/2, 29, 39; 235/449

(56) References Cited

U.S. PATENT DOCUMENTS

| 4,540,897 A | 9/1985 | Takaoka et al. |
| 4,578,720 A | 3/1986 | Matsumoto |
| 4,626,670 A | 12/1986 | Miller |
| 5,285,328 A | 2/1994 | Behr et al. |

FOREIGN PATENT DOCUMENTS

| DE | 37 14 244 A1 | 11/1988 |
| EP | 0 222 132 A2 | 5/1987 |
| EP | 0 700 042 A1 | 3/1996 |
| EP | 0 753 850 A1 | 1/1997 |
| WO | WO 93/22841 A | 11/1993 |

OTHER PUBLICATIONS

Patent Abstracts of Japan, vol. 015, No. 119 (P–1183), Mar. 22, 1991, & JP 03 008101 A (Omron Tateisi Electron Co.), Jan. 16, 1991.

Patent Abstracts of Japan, vol. 013, No. 309 (P–898), Jul. 14, 1989, & JP 01 082303 A (Hitachi Ltd), Mar. 28, 1989.

Patent Abstracts of Japan, vol. 006, No. 168 (P–139), Sep. 2, 1982, & JP 57 086121 A (Nippon Shiyuuhenki KK; Others: 02) May 29, 1982.

Patent Abstracts of Japan, vol. 011, No. 113 (E–497), Apr. 9, 1987, & JP 61 261917 A (Mitsubishi Electric Corp.), Nov. 20, 1986.

*Primary Examiner*—Regina N. Holder
(74) *Attorney, Agent, or Firm*—Sughrue Mion, PLLC

(57) ABSTRACT

A magnetic card reader for causing a magnetic card to make a move relative to a magnetic head and reproducing data on the magnetic card by the magnetic head, said magnetic card reader includes an amplifier for amplifying a magnetic signal provided by the magnetic head, a peak detection section for detecting a peak point of amplifier output from the amplifier output, a data reproduction section for reproducing digital data based on the interval between the peak points, an anomaly detection section for detecting an anomaly of the peak point interval and an output value storage section for converting the amplifier output from analog form into digital form every predetermined time and storing the provided data.

5 Claims, 24 Drawing Sheets

CATEGORY CLASSIFICATION

REPLENISHING WITH DATA

SMOOTHING OBTAINING
MOVING AVERAGE METHOD

PREPARATION OF THERSHOLD CURVE

SETTING OF THERSHOLD CURVE

FIG. 31
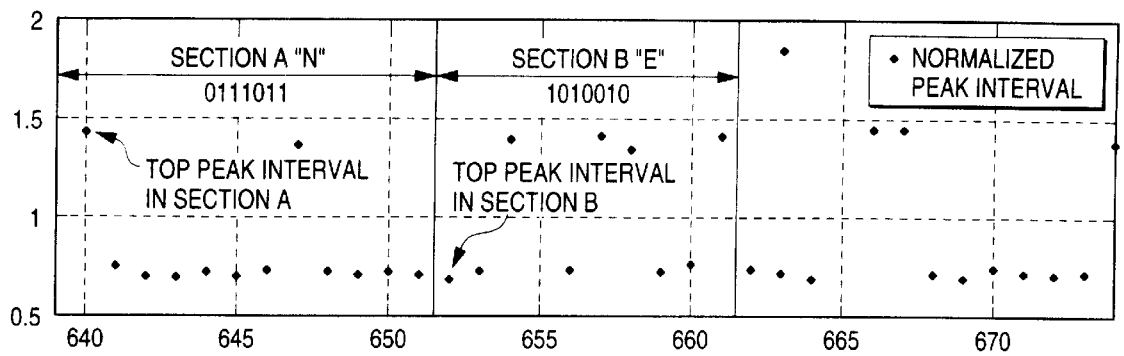
FIG. 32
| PEAK INTERVAL NO. | 74 | 75 | 76 | 77 | 78 | 79 | 80 | 81 | 82 | 83 | 84 | |
|---|---|---|---|---|---|---|---|---|---|---|---|---|
| PEAK INTERVAL VALUE | 0.477 | 0.373 | 20.47 | 0.862 | 0.451 | 0.504 | 0.977 | 1.02 | 0.969 | 1.02 | 1.04 | |
| PEAK INTERVAL NO. | 85 | 86 | 87 | 88 | 89 | 90 | 91 | 92 | 93 | 94 | 95 | |
| PEAK INTERVAL VALUE | 0.487 | 0.502 | 1.04 | 0.465 | 0.525 | 0.970 | 1.018 | 0.501 | 0.493 | 0.505 | 0.487 | |
FIG. 33
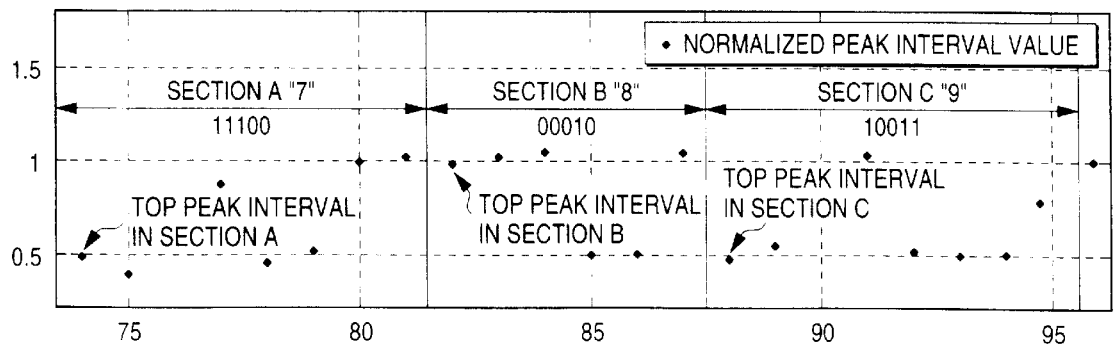

MAGNETIC CARD READER AND MAGNETIC DATA REPRODUCTION METHOD, DATA DEMODULATION METHOD AND DEMODULATOR OF MAGNETIC RECORD DATA

This is a divisional of application Ser. No. 09/767,840 filed Jan. 24, 2001; the disclosure of which is incorporated herein by reference.

BACKGROUND OF INVENTION

1. Field of Invention

This invention relates to a reader of digital information record and a digital data reproduction method. More particularly, the invention relates to a magnetic card reader and a magnetic data reproduction method.

The invention relates to a data demodulation method and a demodulator of magnetic record data for demodulating magnetic record data written to various magnetic record media of a magnetic card, etc.

2. Related Arts

Hitherto, a card reader, for example, as shown in FIGS. 35 and 36 has been known as a card reader for reading magnetic data on a magnetic card. A magnetic card reader 901 comprises a slide groove 903 for inserting and sliding a magnetic card 902, a magnetic head 904 for reading magnetic data on the magnetic card 902, and a circuit board 905 for processing a read signal. The magnetic card 902 is formed on a surface with a magnetic stripe 906 where magnetic data is recorded, and the magnetic card 902 is inserted into the slide groove 903, whereby the magnetic head 904 comes in contact with the magnetic stripe 906. To read the magnetic data, the magnetic card 902 is inserted into the slide groove 903 and is slid in the arrow direction in FIG. 35 manually if the magnetic card reader 901 is manual or by a transport roller, etc., if the magnetic card reader 901 is of motor transport type, whereby the relative positions of the magnetic stripe 906 and the magnetic head 904 are moved and the magnetic head 904 reads the magnetic data on the magnetic stripe 906 in sequence. The magnetic data read by the magnetic head 904 is input to a demodulation circuit placed on the circuit board 905 as an analog signal and undergoes waveform shaping in the demodulation circuit and is reproduced as digital data.

A bit tracking system made up of a peak detection circuit and a peak-to-peak interval measuring circuit is generally used as a technique for processing the analog signal read by the magnetic head 904 and converting the analog signal into digital data.

Generally, in record and reproduction apparatus for handling magnetic record media such as a magnetic card, for example, as shown in FIG. 37, magnetic record data information (see FIG. 38(a)) consisting of two types of frequencies (F and 2F) in combination written to a magnetic record medium 911 such as a magnetic card is reproduced as an analog signal by a magnetic head 912, one of signals provided by passing the analog reproduction signal through two amplifiers 913 and 913 undergoes waveform shaping in a comparator 914 to provide binarization data (see FIG. 38(e)), the peak position occurring at the magnetic inversion position of the above-mentioned analog reproduction signal is previously detected by a peak detection circuit 5 comprising a differentiation circuit, an integration circuit, etc., (see FIG. 38(c)), a timing signal (see FIG. 38(f)) at the level corresponding to peak output of the analog reproduction signal is generated by a timing generation circuit 917 in accordance with a peak interval signal (see FIG. 38(d)) provided by waveform-shaping and binarizing the peak position in a comparator 916, the time interval between the adjacent peak positions is counted using a data discrimination circuit or a CPU 918, and the magnetic record data is demodulated based on the interval data provided by counting the time interval.

At this time, in the data discrimination circuit or the CPU 918, reference time $\alpha T$ is set relative to interval data T and the presence or absence of inversion of the signal polarity in the reference time $\alpha T$ is detected, whereby binary determination is made and demodulation data is provided. To perform data demodulation in such a manner, hitherto a bit tracking system, for example, as shown in FIG. 39 has been proposed so as to cope with fluctuations in the transport speed if a magnetic record medium such as a magnetic card is manually transported particularly in a manual record and reproduction apparatus. In the bit tracking system, for interval data Tk (k=1, 2, . . . ) of the current bit to be demodulated, interval data Tk−1 immediately preceding the interval data Tk is used to set reference time $\alpha$Tk−1 ($\frac{1}{2}<\alpha<1$) and the values are compared with each other in less-than, equal-to, or greater-than relation. According to the bit tracking system, if fluctuation in the transport speed occurs and slight fluctuation occurs in the bit time interval of the above-mentioned reproduction signal, a reference signal is calculated from the immediately preceding bit, whereby occurrence of erroneous read is prevented.

However, in the above-described bit tracking system, the magnetic data cannot be read if the speed of the magnetic card 902 is remarkably lowered or the magnetic card 902 stops; this is a problem. If the magnetic card reader 901 is manual, it is difficult for a human being to handle the magnetic card 902 at constant speed, and the speed may become low, causing a read error to occur. Particularly, a person unfamiliar with handling the magnetic card may shift the card from one hand to the other during inserting the card. At this time, the magnetic card 902 stops completely and thus a read error occurs. If the magnetic card reader 901 is of motor transport type, a read error may also occur partially because of a collision with the transport roller, etc. If the magnetic card 902 is handled at enough speed, a read error may be caused by a flaw made on the magnetic stripe 906, disturbance noise, etc. If a read error occurs even in a part of the read data, the magnetic card reader 901 in the related art needs to again read the magnetic card 902.

When such a read error occurs, if the manual card reader 901 is a card reader for use with both the magnetic stripe 906 and an IC chip, a case where the operator is prompted to take out the card 902 and the magnetic data is read when the card is taken out or a case where control is transferred to communication processing with the IC chip is possible. However, in the former case, the transition timing to the communication processing with the IC chip does not exist and the operator must be made to again insert the card 902 for the communication processing with the IC chip. In the latter case, if an IC chip does not exist or communications cannot be conducted or the IC chip is not supported, the magnetic data is read again at the taking-out time and processing is continued or the operator must be made to again insert the card 902. As a message for prompting the operator to perform the next operation and error handling are thus provided in agreement with a possible situation, the processor becomes complicated and ease of operation of the card reader also worsens.

On the other hand, placing strict requirements on handling the magnetic card 90 and the quality of the magnetic stripe 906 to prevent such a read error involves a problem from the viewpoint of ease of operation of the card reader.

Also in the bit tracking system with the immediately preceding data as the reference, if the transport speed of a record medium such as a magnetic card fluctuates rapidly, it is made impossible to follow the speed fluctuation and it is feared that erroneous read may be incurred. For example, interval data T4 in FIG. 39 is a "1" signal correctly, and essentially the signal polarity should be inverted within the time range of the reference time α3T set based on the immediately preceding interval data T3. In fact, however, the time interval may be prolonged largely because the above-described manual system, etc., is adopted; consequently, inversion of the signal polarity does not take place within the time range of the reference time α3T and the original correct "1" signal is read erroneously as a "0" signal. If an automatic system using motor drive is adopted, there is also a possibility that similar erroneous read will occur.

Further, if the passage speed of a magnetic record medium such as a magnetic card relative to the magnetic head 912 becomes rapidly low or the magnetic record medium stops, change in analog reproduction signal caused by magnetic inversion, namely, the peak value magnitude is decreased and the analog reproduction signal change, namely, the time interval between the adjacent peak positions is prolonged. Consequently, for example, in a differentiation circuit, peak detection may become impossible to make because the peak value is small; if an integration circuit is used, a low frequency signal is cut and thus it may be made impossible to make peak detection of a signal with a long time interval and since signal noise is accumulated, low frequency noise appears and peak detection may become impossible to make.

If the passage speed of a magnetic record medium such as a magnetic card rapidly changes or the magnetic record medium stops, the read speed of the immediately preceding interval data Tk−1 and that of the current interval data Tk in the bit tracking system described above become drastically different from each other and therefore it is made impossible to make a comparison between the immediately preceding interval data Tk−1 and the current interval data Tk, and precise demodulation may become impossible.

SUMMARY OF INVENTION

It is therefore an object of the invention to provide a magnetic card reader and a magnetic data reproduction method wherein if a usual read error occurs when a magnetic card is read, it is not necessary to again read the magnetic card and handling and processing the card are unified and the erroneous portion can be corrected.

It is an object of the invention to provide a data modulation method of magnetic record data so as to make it possible to stably execute demodulation according to a simple configuration if the transport speed of a magnetic record medium fluctuates.

It is an object of the invention to provide a data modulation method and a demodulator of magnetic record data so as to make it possible to stably execute demodulation according to a simple configuration if the transport speed of a magnetic record medium lowers.

It is an object of the invention to provide a data modulation method of magnetic record data so as to make it possible to execute precise demodulation according to a simple configuration if the transport speed of a magnetic record medium rapidly changes or the magnetic record medium stops.

BRIEF DESCRIPTION OF THE DRAWINGS

In the accompanying drawings:

FIG. 20A is a chart to show a peak interval signal provided from an analog reproduction signal and FIG. 20B is a chart to show digital data of the analog reproduction signal;

FIG. 31 is a chart to represent one example of the relationship between peak interval sequences and characters;

FIG. 32 is a table representing one example of peak interval value resulting in error character;

FIG. 33 is a chart to represent peak interval sequences based on the peak interval values in FIG. 32;

DETAILED DESCRIPTION OF PREFERRED EMBODIMENTS

First Embodiment

Figure 1:
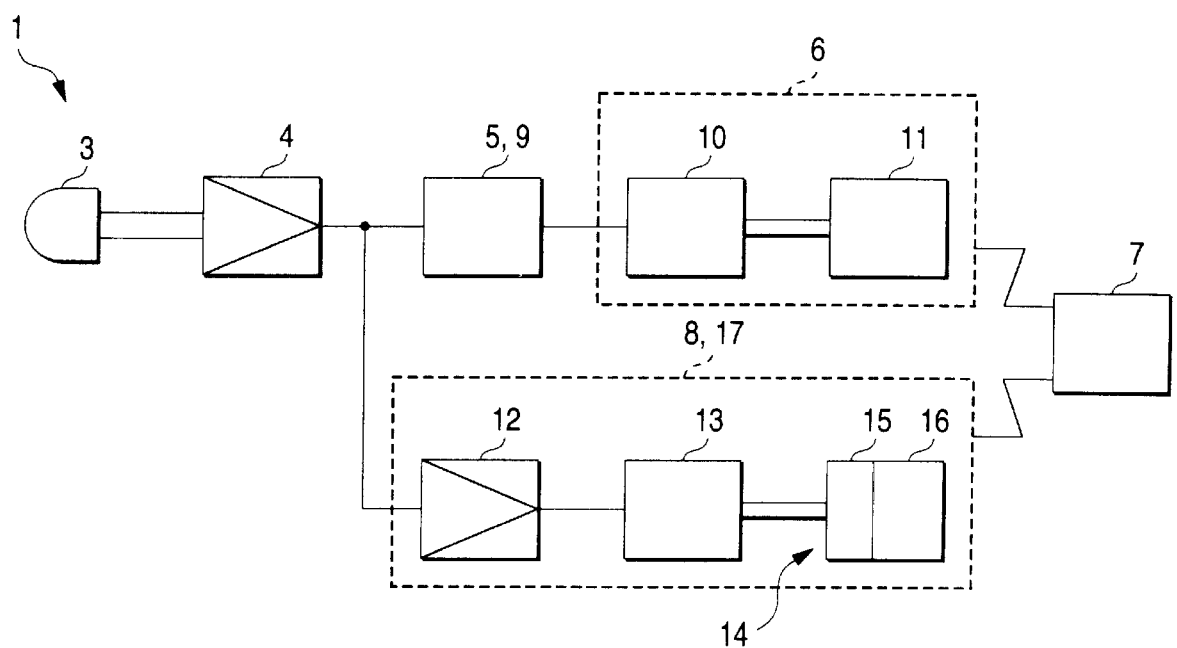
FIG. 1 is a schematic diagram to show one example of the circuit configuration of a magnetic card reader of the invention.
Figure 2:
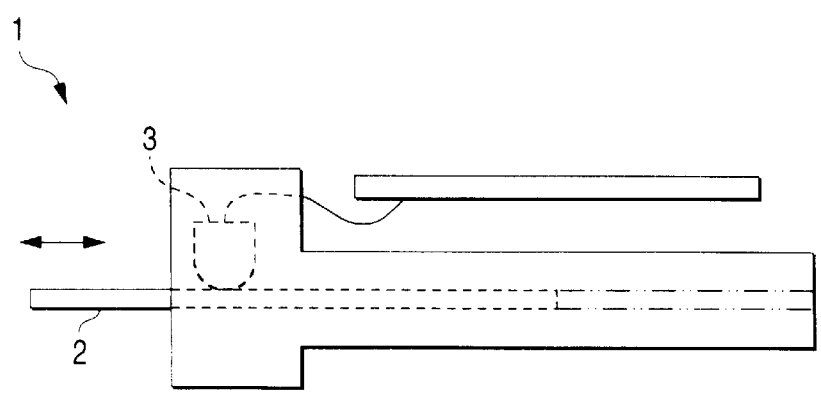
FIG. 2 is a schematic side view of the magnetic card reader of the invention.
Figure 3:
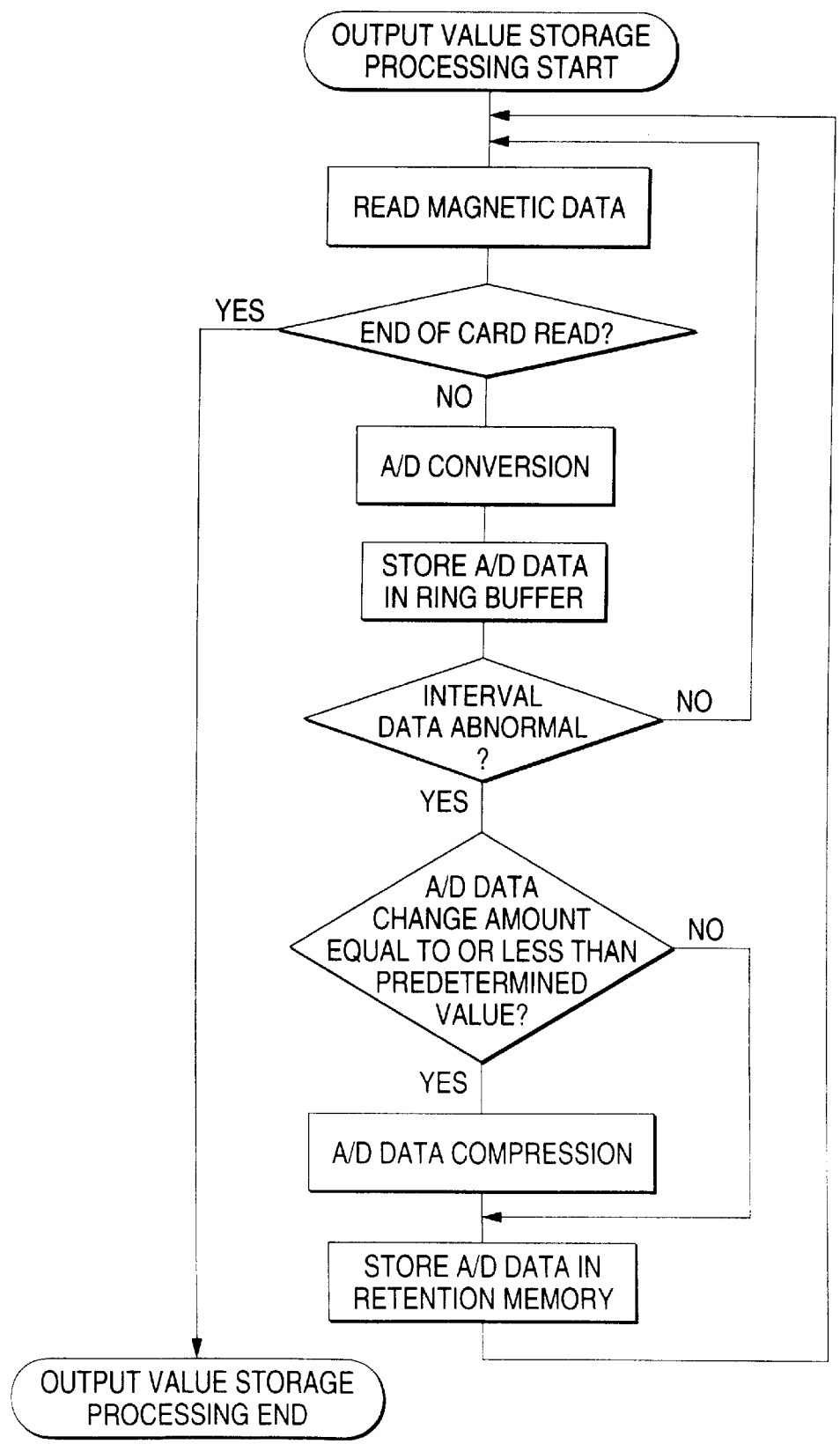
FIG. 3 is a flowchart to show one example of output value storage processing of the magnetic card reader of the invention.

A first embodiment of the invention will be discussed in detail with reference to the accompanying drawings. FIGS. 1 to 3 show a magnetic card reader and a magnetic data reproduction method of the invention.

A magnetic card reader 1 of the invention is a magnetic card reader for causing a magnetic card 2 to make a move relative to a magnetic head 3 and reproducing data on the magnetic card 2 by the magnetic head 3. It comprises an amplifier 4 for amplifying a magnetic signal provided by the magnetic head 3, a peak detection section 5 for detecting a peak point of amplifier output from the amplifier output, a data reproduction section 6 for reproducing digital data based on the interval between the peak points, an anomaly detection section 7 for detecting an anomaly of the peak point interval, and an output value storage section 8 for converting the amplifier output from analog form into digital form every predetermined time and storing the provided data.

The peak detection section 5 is implemented as a known peak detection circuit 9 for detecting the peak point of an input analog signal. The data reproduction section 6 has an interval measuring circuit 10 for using output from the peak detection circuit 9 to measure interval data of the interval between the peak points. It determines whether the bit is "1" or "0" based on the interval of the interval data and demodulates the data as digital data. The data reproduction section 6 also comprises a peak interval storage section 11 for storing the interval data together with the measuring time, which will be hereinafter referred to as time stamp. Thus, the data reproduction section 6 need not reproduce digital data in real time and can reproduce data based on the interval data stored in the peak interval storage section 11.

The anomaly detection section 7 performs anomaly detection processing of checking the interval data stored in the peak interval storage section 11 to see if a peak appears at a given interval and checking whether or not the data is normal data satisfying a predetermined condition. The predetermined condition is not limited if it is fitted to the required image quality. The anomaly detection processing may be programmed and a parameter may be given to the program for specifying the condition so that setting can be changed. For example, the programmed processing is set so as to determine an anomaly if a comparison is made between the interval data of the preceding interval and that of the following interval and only the interval of 25% or less exists. The anomaly detection section 7 checks whether or not the interval data stored in the peak interval storage section 11 is normal data satisfying the predetermined condition, and thus need not monitor the interval data in real time.

The output value storage section 8 converts an amplifier output signal from analog form into digital form every predetermined time and storing the digital data so that if the anomaly detection section 7 detects abnormal interval data, analog magnetic data before undergoing waveform shaping can be analyzed and the original correct signal can be estimated for correcting the abnormal portion.

The output value storage section 8 comprises a second-stage amplifier 12 for furthermore amplifying the amplifier output signal, an A/D converter 13 for converting an output signal of the second-stage amplifier 12, which will be hereinafter referred to as second-stage amplifier output signal, every predetermined time at which data modulation can be executed, and memory 14 for storing the provided A/D data.

The memory capacity is finite and particularly, if all A/D data of a large data amount is retained, it is feared that the data may overflow the memory 14. On the other hand, an increase in the capacity of the memory 14 has a limit from the point of costs. Particularly, it is not adequate to increase the memory capacity indiscriminately in a manual magnetic card reader having the advantage of low costs. Then, in the magnetic card reader 1 and the magnetic data reproduction method of the invention, the following is devised to efficiently collect and store A/D data for correction with the memory capacity suppressed:

The A/D data corresponding to the normal interval data whose anomaly is not detected by the anomaly detection section 7 has a low possibility that it will be analyzed at the anomaly detection time. Then, if predetermined free space does not exist in the memory 14, the A/D data corresponding to the normal interval data can be discarded.

For example, the memory 14 can be made up of buffer memory 15, which will be hereinafter referred to as ring buffer 15, and retention memory 16. The second-stage amplifier output signal is converted from analog form into digital form every predetermined time and is stored in the ring buffer 15 as A/D data together with its time stamp. In the ring buffer 15, the data is stored in sequence starting at the start address and when data is stored to the end address, data is stored again starting at the start address. At this time, the old A/D data is overwritten with the new A/D data.

If the anomaly detection section 7 detects abnormal interval data, it transmits a notification signal to the output value storage section 8, which then stores the A/D data stored in the ring buffer 15 corresponding to the interval data whose anomaly is detected in the retention memory 16 together with the time stamp. The A/D data corresponding to the interval data whose anomaly is detected can be identified using the time stamp.

According to the configuration, the output value storage section 8 stores the A/D data to be analyzed, whose anomaly is detected by the anomaly detection section 7 in the retention memory 16. On the other hand, the A/D data corresponding to the normal interval data is left in the ring buffer 15 so that it can be overwritten, namely, can be discarded when the ring buffer 15 fills with data. Thus, the memory 14 can be saved, the memory capacity can be suppressed, and the A/D data for correction can be collected efficiently.

By the way, if the speed of the magnetic card 2 is remarkably low, precise interval data cannot be measured and the possibility that a read error will occur is high. Thus, an interval data anomaly is detected by the anomaly detection section 7 and the amount of the A/D data stored in the retention memory 16 is increased. Since A/D conversion is executed every predetermined time, as the speed of the magnetic card 2 is low and the read time is more prolonged, the amount of the A/D data stored in the retention memory 16 is furthermore increased.

However, as mentioned above, the memory capacity is finite and if all A/D data is retained, it is feared that the data may overflow the retention memory 16.

Then, the output value storage section 8 comprises a change amount detection section 17 so as to compress redundant A/D data without degrading precision. The change amount detection section 17 performs change amount detection processing of detecting the change amount in A/D data within a predetermined time range and if the detection amount is equal to or less than a predetermined amount, determining the representative value of the A/D data within the time range and retaining the representative value in the memory 14 together with the time stamp. The predetermined time range and the predetermined value of the change amount are not limited if they are fitted to the required image quality. The change amount detection processing may be programmed and a parameter may be given to the program so that setting can be changed. For example, if the change rate in 10 continuous A/D data pieces at a given time interval is ±1% or less, one intermediate data piece is left, whereby the data can be compressed to one tenth. The compressed A/D data can be restored assuming that it is a constant representative value for a predetermined time based on the time stamp. The representative value determining method is not limited. For example, the average value of 10 continuous A/D data pieces at a given time interval may be calculated as a representative value.

According to the configuration, the memory capacity can be suppressed and the A/D data for correction can be collected efficiently. If the anomaly detection section 7 detects abnormal interval data, the collected A/D data is analyzed, whereby the original correct signal is estimated and the abnormal portion is corrected. The A/D data analysis and correction method is not limited. For example, an analog waveform is reproduced from the collected A/D data and can be analyzed to estimate a peak point, whereby the original correct signal is estimated, interval data for correction is prepared, and the abnormal portion can be corrected.

Next, the process of actually reproducing magnetic data by the magnetic card reader 1 will be discussed.

With the magnetic card reader 1 comprising the magnetic head 3 for reproducing data on the magnetic card 2, an analog magnetic signal provided by the magnetic head 3 is amplified by the amplifier 4 and is passed to the peak detection circuit 9 and the output value storage section 8.

The peak detection circuit 9 detects the peak point of the analog magnetic signal. The peak point is measured as interval data by the interval measuring circuit 10 and is stored in the peak interval storage section 11 together with the time stamp. At this time, the anomaly detection section 7 checks whether or not the interval data is normal data satisfying a predetermined condition.

On the other hand, the output value storage section 8 performs output value storage processing shown in FIG. 3 to suppress the memory capacity and collect A/D data for correction efficiently. The analog magnetic signal amplified by the second-stage amplifier 12 is input to the output value storage section 8 until read of the magnetic card terminates, and is converted from analog form into digital form by the A/D converter 13 every predetermined time. The provided A/D data is stored in the ring buffer 15 together with the time stamp. At this time, if the ring buffer 15 fills with data, the oldest A/D data stored at the end address is overwritten with the newest A/D data. If the anomaly detection section 7 detects abnormal interval data, it transmits a notification signal to the output value storage section 8, which then stores the A/D data stored in the ring buffer 15 corresponding to the interval data whose anomaly is detected in the retention memory 16 together with the time stamp. At this time, if the change amount in the A/D data within a predetermined time range detected by the change amount detection section 17 is equal to or less than a predetermined amount, only the representative value of the A/D data within the time range is retained in the retention memory 16 together with the time stamp.

The data reproduction section 6 reproduces digital data based on the interval data in the peak interval storage section 11. At this time, if interval data of an abnormal portion where an anomaly is detected exists, an analog waveform is reproduced using the A/D data and the time stamp stored in the retention memory 16 and is analyzed to estimate a peak point, whereby the original correct signal is estimated, interval data for correction is prepared, and the abnormal portion is corrected. Since the data for reproduction is stored in the peak interval storage section 11 and the data for correction is stored in the retention memory 16, the data reproduction processing need not be performed in real time and the data reproduction timing is not limited.

As described above, according to the magnetic card reader and the magnetic data reproduction method of the invention, when the speed of a card remarkably lowers or the card stops in the manual magnetic card reader or a collision with a transport roller, etc., occurs in the magnetic card reader of motor transport type, if a read error occurs, it is not necessary to again read the card and the error portion can be corrected. Further, the probability that a card formerly unable to be read because of a flaw made on a magnetic stripe, disturbance noise, etc., can be read is raised.

The described embodiment is one preferred embedment of the invention, but the invention is not limited to the embodiment and the combination and arrangement of parts may be resorted without departing from the spirit and the scope of the invention.

For example, the configuration of the memory 14 for making it possible to discard the A/D data having a low possibility that it will be analyzed is not limited to use of the ring buffer. For example, the ring buffer 15 may be omitted and the A/D data may be retained directly in the retention memory 16. In this case, when an anomaly detection notification signal does not exist within a predetermined time, the A/D data stored in the retention memory 16 within the predetermined time may be discarded assuming that the data has a low possibility that it will be analyzed.

Figure 4:
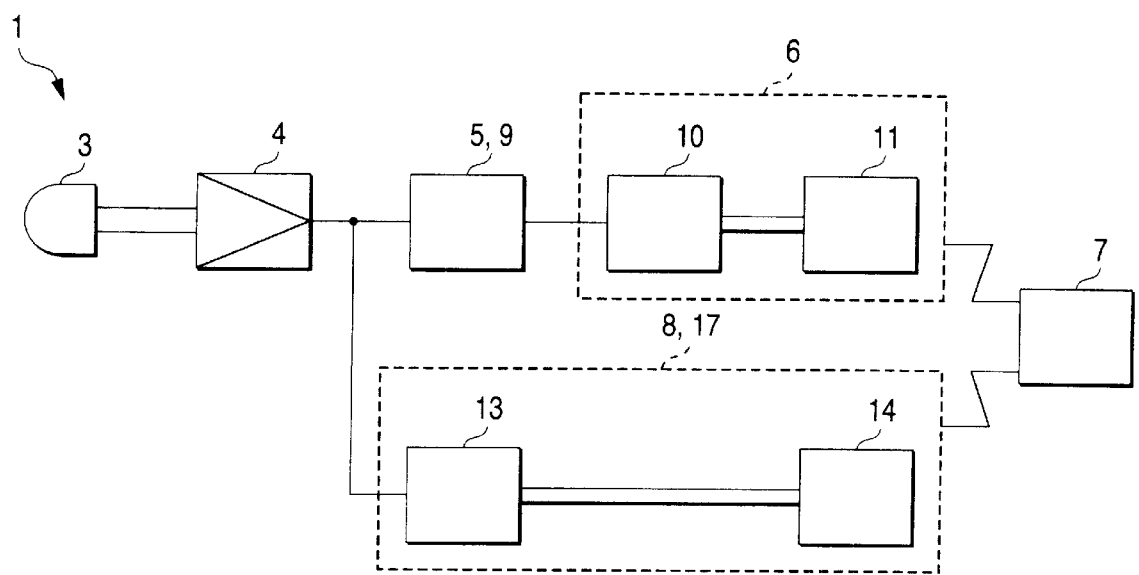
FIG. 4 is a schematic diagram to show another example of the circuit configuration of the magnetic card reader of the invention.

As shown in FIG. 4, the second-stage amplifier 12 of the output value storage section 8 may be omitted.

Figure 5:
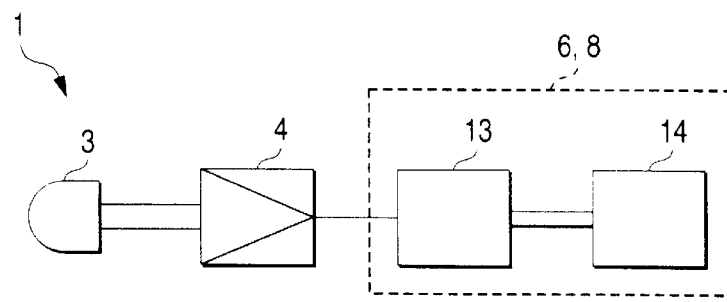
FIG. 5 is a schematic diagram to show another example of the circuit configuration of the magnetic card reader of the invention.

As shown in FIG. 5, the data reproduction section 6 may use only the A/D data in the output value storage section 8 to conduct digital demodulation.

If the insertion speed of the card 2 is extremely high, the A/D data provided while the card is inserted cannot be analyzed as analog data and thus may be discarded. In this case, the interval data in the peak interval storage section 11 while the insertion speed of the card 2 is extremely high can be analyzed and thus there is no problem in reproduction of digital data.

According to this embodiment, there is provided a magnetic card reader for causing a magnetic card to make a move relative to a magnetic head and reproducing data on the magnetic card by the magnetic head, the magnetic card reader comprising an amplifier for amplifying a magnetic signal provided by the magnetic head, a peak detection section for detecting a peak point of amplifier output from the amplifier output, a data reproduction section for reproducing digital data based on the interval between the peak points, an anomaly detection section for detecting an anomaly of the peak point interval, and an output value storage section for converting the amplifier output from analog form into digital form every predetermined time and storing the provided data. Thus, if the anomaly detection section detects abnormal interval data, the A/D data stored in the output value storage section is analyzed, whereby the original correct signal can be estimated and the erroneous portion can be corrected.

Thus, when the speed of a card remarkably lowers or the card stops in the manual magnetic card reader or a collision with a transport roller, etc., occurs in the magnetic card reader of motor transport type, if a read error occurs, it is not necessary to again read the card and the error portion can be corrected. Further, the probability that a card formerly unable to be read because of a flaw made on a magnetic stripe, disturbance noise, etc., can be read is raised.

According to the magnetic card reader of this embodiment the data reproduction section has a peak interval storage section for measuring and storing the peak point interval and reproduces a reproduction portion detected by the anomaly detection section based on the data in the output value storage section, so that digital data need not be reproduced in real time. Thus, the digital data can be reproduced independently of the speed difference between processing in the anomaly detection section and the output value storage section and processing in the data reproduction section while coordination of one processing with any other processing is made.

According to the magnetic card reader of this embodiment, the anomaly detection section detects an anomaly of the peak point interval stored in the peak interval storage section, so that the interval data need not be monitored in real time. Thus, the processing speed in the anomaly detection section need not be specified and the requirement of the processing capability for the anomaly detection section can be eased.

Further, according to the magnetic card reader of this embodiment, the output value storage section can discard the data corresponding to the reproduction portion whose anomaly is not detected by the anomaly detection section, so that the memory capacity can be suppressed and the A/D data for correction can be collected efficiently.

Further, according to the magnetic card reader of this embodiment, the output value storage section comprises a change amount detection section for performing the A/D conversion and detecting the change amount in the provided data output values and if the change amount is equal to or less than a predetermined value, compresses the provided data. Thus, redundant A/D data can be compressed, the memory can be saved, the memory capacity can be suppressed, and the A/D data for correction can be collected efficiently.

According to this embodiment, there is provided a magnetic data reproduction method of causing a magnetic card to make a move relative to a magnetic head and reproducing data on the magnetic card by the magnetic head, the magnetic data reproduction method comprising the data reproduction step of detecting from output of a magnetic signal provided by the magnetic head, a peak point of the output and reproducing digital data based on the interval between the peak points, the anomaly detection step of detecting an anomaly of the peak point interval, and the output value storage step of converting the output of the magnetic signal provided by the magnetic head from analog form into digital form every predetermined time and storing the provided data, characterized in that the data reproduction step reproduces a reproduction portion detected in the anomaly detection step using the data provided in the output value storage step. Thus, if abnormal interval data is detected in the anomaly detection step, exception processing in the data reproduction step is applied and the A/D data stored in the output value storage step is analyzed, whereby the original correct signal can be estimated and the erroneous portion can be corrected.

Thus, when the speed of a card remarkably lowers or the card stops in the manual magnetic card reader or a collision with a transport roller, etc., occurs in the magnetic card reader of motor transport type, if a read error occurs, it is not necessary to again read the card and the error portion can be corrected. Further, the probability that a card formerly unable to be read because of a flaw made on a magnetic stripe, disturbance noise, etc., can be read is raised.

Further, according to the magnetic data reproduction method of this embodiment, the output value storage step makes it possible to discard the data corresponding to the reproduction portion whose anomaly is not detected in the anomaly detection step, so that the memory capacity can be suppressed and the A/D data for correction can be collected efficiently.

Further, according to the magnetic data reproduction method of this embodiment, the output value storage step includes the change amount detection step of performing the A/D conversion and detecting the change amount in the provided data output values and if the change amount is equal to or less than a predetermined value, compresses the provided data. Thus, redundant A/D data can be compressed, the memory can be saved, the memory capacity can be suppressed, and the A/D data for correction can be collected efficiently.

Second Embodiment

A second embodiment of the invention will be discussed in detail with reference to the accompanying drawings.

Figure 9:
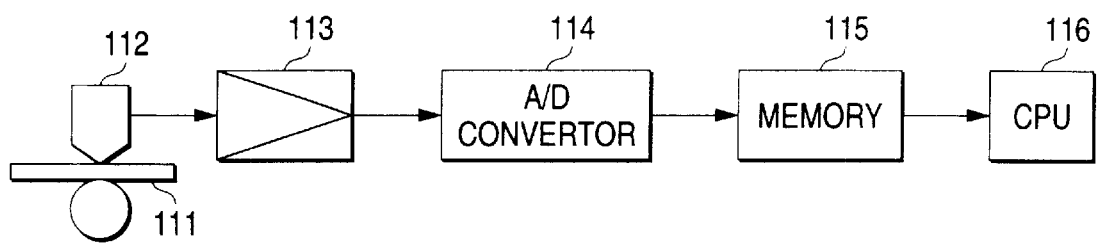
FIG. 9 is a block diagram to show a magnetic card reader example to execute the data demodulation method of magnetic record data according to the invention represented in FIG. 6.

First, in a record and reproduction apparatus adopted for using a method according to the invention to read a magnetic card, for example, as shown in FIG. 9, magnetic record data written to a magnetic record medium 111 (see FIG. 38(a)) is reproduced as an analog signal by a magnetic head 112 and the analog signal is passed through an amplifier 113, then the resultant analog reproduction signal (see FIG. 38(b)) is counted by an A/D converter 114 and the count data is temporarily stored in memory 115. The data in the memory 115 is read by a CPU 116 whenever necessary, and processing according to one embodiment of the invention as described below is performed.

The CPU 116 first references all data of magnetic reproduction signals stored in the memory 115 and measures interval data T between peaks from the data, thereby detecting all interval data T. As shown in step S1 in FIG. 6, the CPU 116 computes reciprocal V of every interval data T provided as described above, thereby providing frequency data as in FIG. 10 (reciprocal of time and therefore frequency data), and stores the frequency data in the memory 115 at step S2 in FIG. 6.

Figure 10:
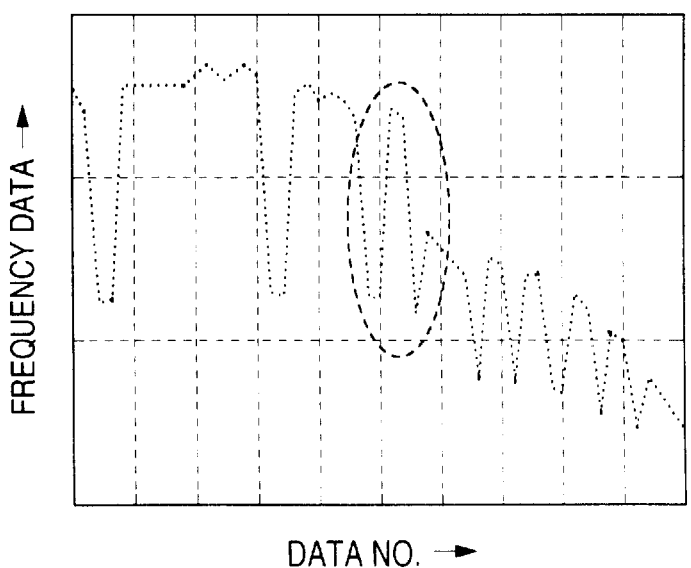
FIG. 10 is a diagram to represent speed (frequency) data between magnetic flux inversions.

At this time, the magnetic flux inversion time (interval data T) concerning a "0" signal portion (1F) should be about twice the magnetic flux inversion time (interval data T) concerning a "1" signal portion (2F) and thus in terms of frequencies, conversely, the frequency data corresponding to the "1" signal portion (2F) should be about twice the frequency data corresponding to the "0" signal portion (1F). Therefore, as shown in FIG. 10, the whole of the frequency data appears as separation into an upper curve and a lower curve. This means that the upper frequency curve corresponds to the "1" signal portion (2F) and that the lower frequency curve corresponds to the "0" signal portion (1F).

Next, considering the frequency change rate between the "0" signal portion (1F) and the "1" signal portion (2F),
(1) the frequency of the "1" signal portion (2F) relative to the "0" signal portion (1F) is about twice;
(2) the frequency of the "0" signal portion (1F) relative to the "1" signal portion (2F) is about a half; and
(3) the frequency of the "0" signal portion (1F) relative to the "0" signal portion (1F) is about once and the frequency of the "1" signal portion (2F) relative to the "1" signal portion (2F) is about once.

Figure 6:
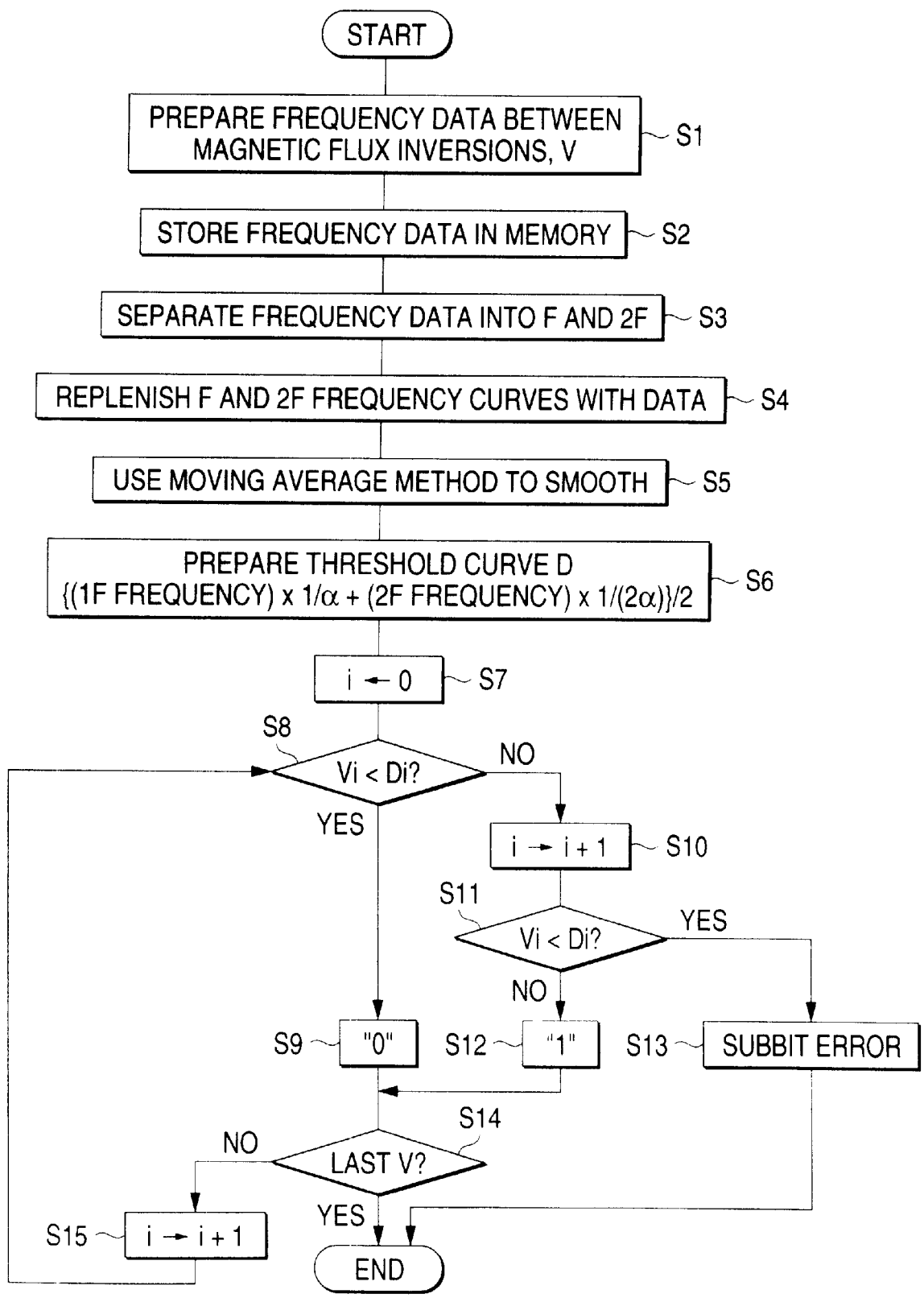
FIG. 6 is a main flowchart to represent one embodiment of a data demodulation method of magnetic record data according to the invention.

Thus, the frequency change rates converge on three points and making use of the fact, the frequency data is classified into three categories of "0" data, "1" data, and "gray zone" data undefined as the "0" data or the "1" data at step S3 in FIG. 6.

Figure 7:
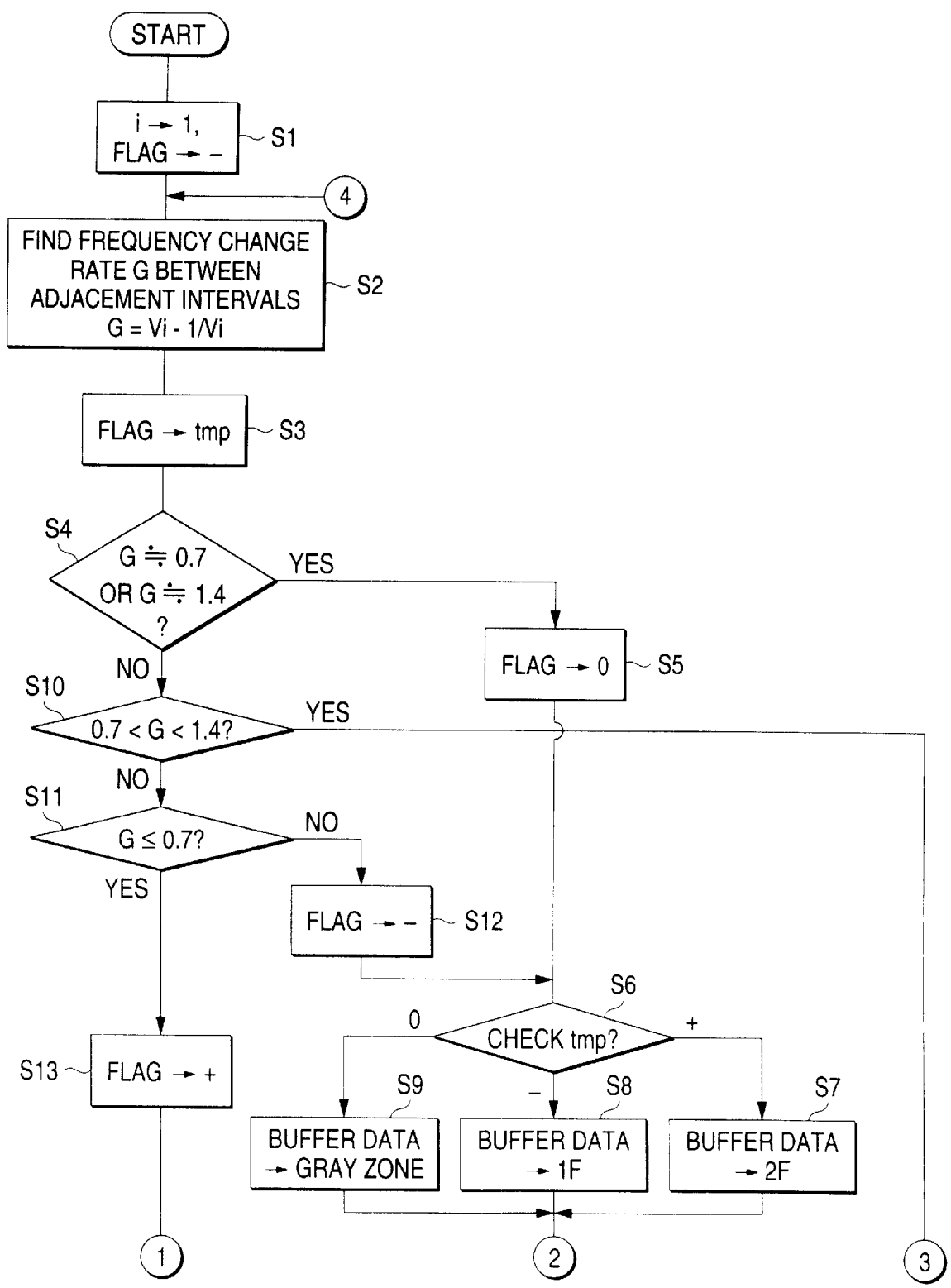
FIG. 7 is a subflowchart to represent one embodiment of a category classification procedure in the main flowchart in FIG. 6.

In a category classification procedure in the embodiment, as shown in FIG. 7, first a counter i is set to "1" and a flag described later is set to "−" at step S1. The flag is initialized to "−" whereby when the first data, STX, is detected, data in a buffer is assumed to be a preamble and can be determined "0" data.

Next, the change rate in frequencies Vi−1 and Vi between adjacent magnetic flux inversions, G (Vi−1/Vi), is calculated in sequence at step S2 and the change rate G and the value of the flag described below are examined, whereby the data in the buffer is classified into the categories whenever necessary. At this time, the preceding frequency data Vi−1 of the two adjacent frequency data pieces Vi−1 and Vi divided by the following frequency data Vi (Vi−1/Vi) is adopted as the frequency change rate G.

The current flag is once set to the preceding value "tmp" at step S3, then the value of the flag is set as follows:
a) If the frequency Vi increases rapidly and the change rate G becomes equal to or less than 0.7 (G≦0.7), the flag is set to "+"
b) if the frequency Vi decreases rapidly and the change rate G becomes equal to or greater than 1.4 (G≧1.4), the flag is set to "−"
c) if the frequency Vi does not change rapidly and the change rate G lies within the range of 0.7 to 1.4 (0.7<G<1.4), the flag is set intact and the frequency data is temporarily stored in the buffer;
d) if the change rate G is in the proximity of 0.7 or 1.4 (G≈0 or G≈1.4) although the frequency Vi does not change rapidly, the flat is set to "0"

The frequency data is classified into the three categories in any other case than c). First, in d) (Yes at step S4), the flag is set to "0" at step S5, then the pre-changed flag tmp is checked at step S6. If the flag temp is "+" the data in the buffer is determined "1" data (2F) at step S7; if the pre-changed flag temp is "−" the data in the buffer is determined "0" data (1F) at step S8.

On the other hand, if the pre-changed flag temp is "0" the data in the buffer is determined "gray zone" data at step S9.

Figure 8:
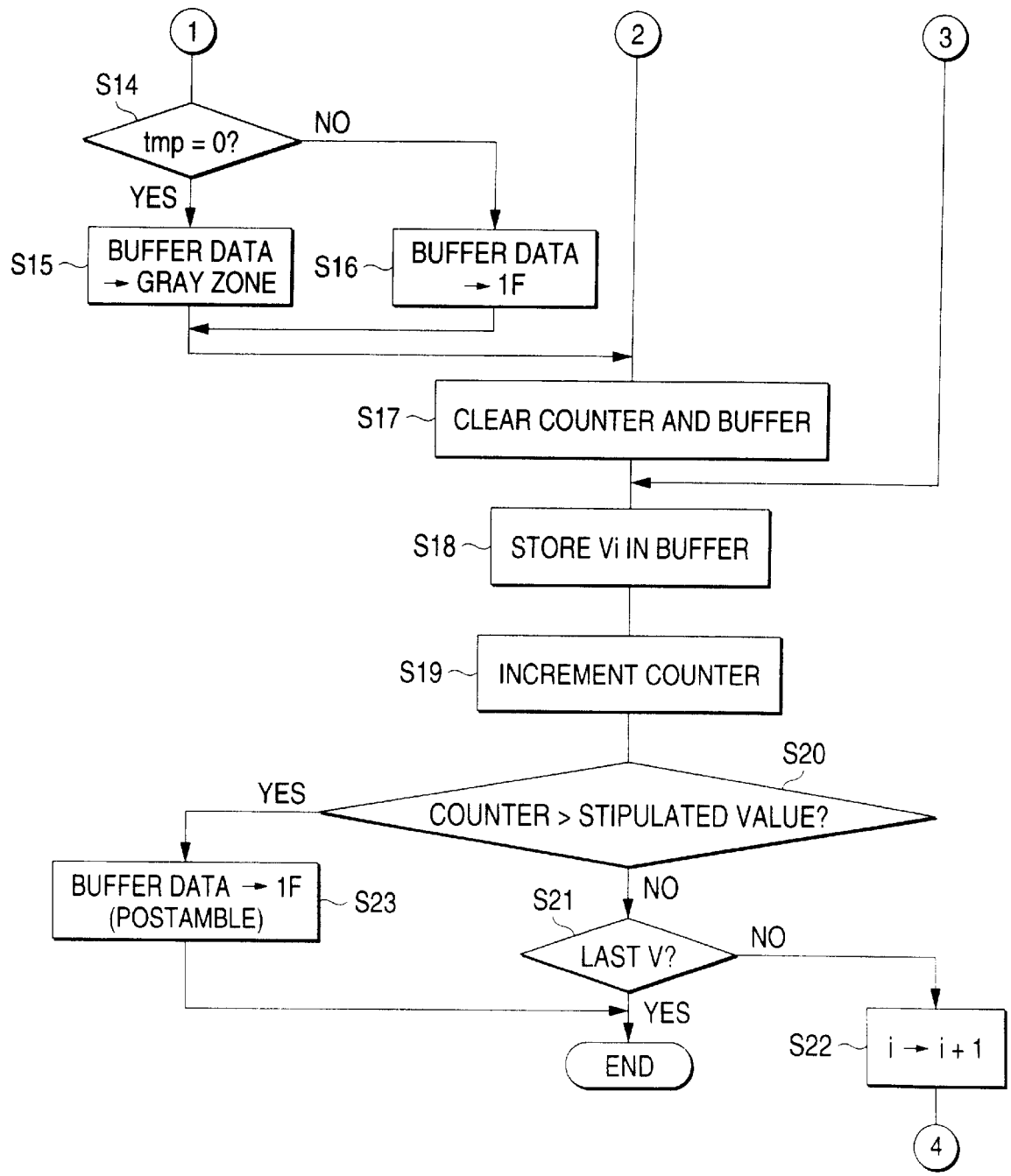
FIG. 8 is a subflowchart to represent a continuation of the subflowchart in FIG. 7.

Next, in c) (Yes at step S10), control goes to step S18 in FIG. 8 without classifying the frequency data. The routine at step S18 and the later steps will be discussed later.

On the other hand, in b) (No at step S11 in FIG. 7), the flag is set to "−" at step S12, then the pre-changed flag tmp is checked at step S6. If the flag temp is "+" the data in the buffer is determined "1" data (2F) at step S7; if the pre-changed flag temp is "−" the data in the buffer is determined "0" data (1F) at step S8. If the pre-changed flag temp is "0" the data in the buffer is determined "gray zone" data at step S9.

Further, in a) (Yes at step S11), the flag is set to "+" at step S13, then the pre-changed flag tmp is checked at step S14 in FIG. 8. If the flag temp is "0" the data in the buffer is determined "gray zone" data at step S15 in FIG. 8; otherwise, the data in the buffer is determined "0" data (1F) at step S16 in FIG. 8.

Thus, in a), b), and d) other than c), the frequency data is classified into any of the categories at the steps described above, then the counter and the buffer are cleared at step S17 and the frequency data Vi determined as described above is stored in the buffer at step S18.

The counter is incremented at step S19, then if the counter does not exceed a preset stipulated value (No at step S20) and the frequency data is not the last (No at step S21), the counter value i is incremented by one (i+1) at step S22, then control returns to the start and the above-described routine is repeated. If the frequency data becomes the last (Yes at step S21), the process is terminated.

On the other hand, if the counter exceeds the preset stipulated value and the frequency data in the buffer also exceeds one stipulated value (Yes at step S20), the data in the buffer is assumed to be a postamble and is determined "0" data (1F) at step S23, and the process is terminated.

Figure 11:
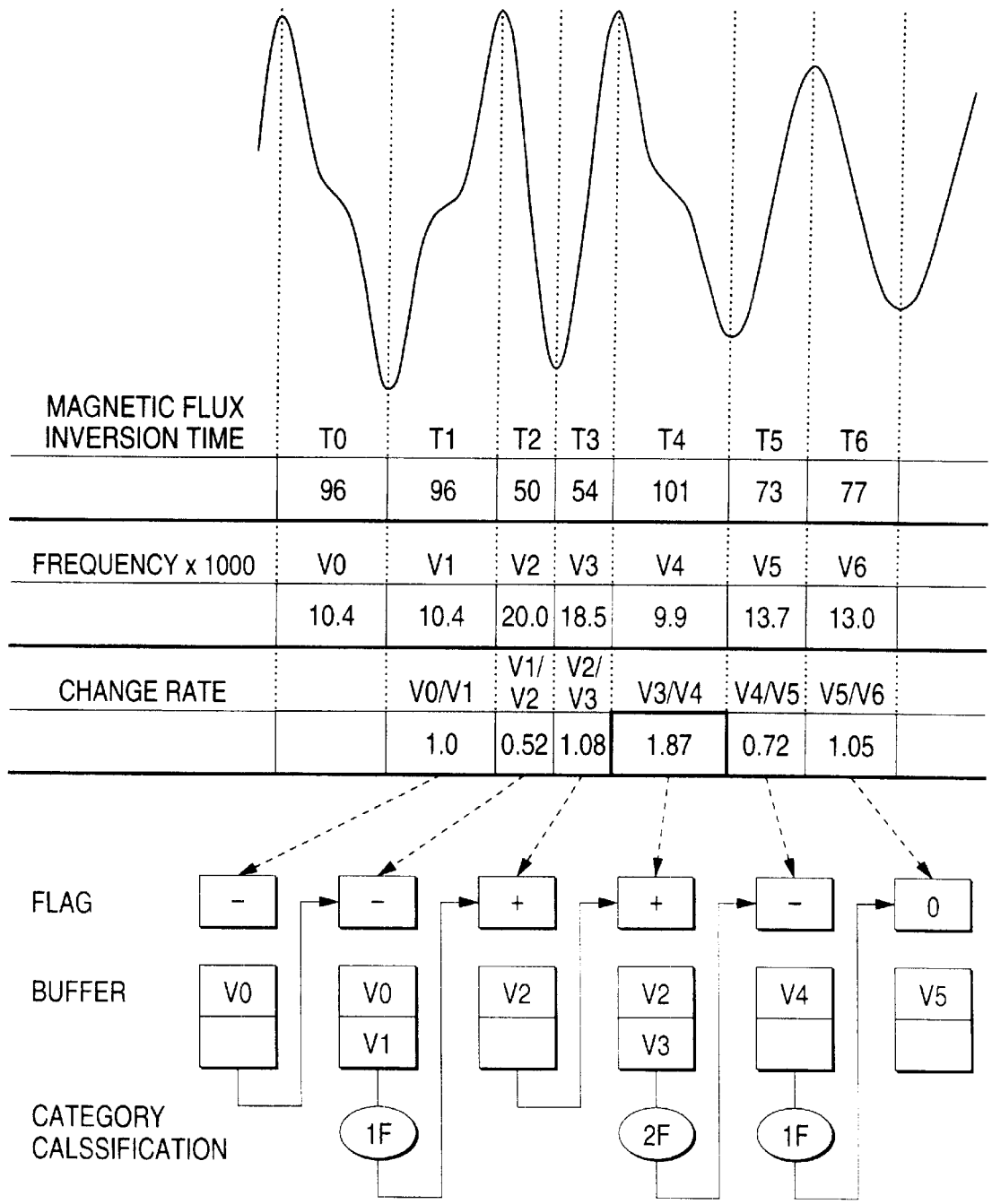
FIG. 11 is a schematic drawing to represent an embodiment of the category classification procedure.

A category classification procedure when an actual magnetic reproduction signal is like a curve in FIG. 11 and magnetic flux inversion time Tk, frequency Vk, and change rate (Vi−1/Vi) for each magnetic domain are as listed in a table in the figure will be discussed. First, the change rate at the frequency V1 is 1.0, which lies in the range of 0.7 to 1.4. Therefore, in this case, processing in c) is performed and the frequency data is only stored in the buffer without changing the flag.

Next, the change rate at the frequency V2 is 0.52, which falls below 0.7 largely. Therefore, in this case, processing in a) is performed. Since the immediately preceding flag is "−" the frequency data in the buffer (V0, V1) is determined "0" data (1F). After the buffer is cleared, V2 is stored in the buffer and the flag is set to "+"

On the other hand, the change rate at the frequency V3 is 1.08, which again lies in the range of 0.7 to 1.4. Therefore, in this case, processing similar to that at the frequency V1 is performed and the frequency data is stored in the buffer without changing the flag.

Further, the change rate at the frequency V4 is 1.87, which exceeds 1.4 largely. Therefore, in this case, processing in b) is performed. Since the immediately preceding flag is "+" the frequency data in the buffer (V2, V3) is determined "1" data (2F). After the buffer is cleared, V4 is stored in the buffer and the flag is set to "−"

The change rate at the frequency V5 is 0.72, which is extremely close to 0.7. Thus, in this case, processing in d) is performed. Since the immediately preceding flag is "−" the frequency data V4 in the buffer is determined "0" data (1F). After the buffer is cleared, V5 is stored in the buffer and the flag is set to "0" Similar category classification is executed until the frequency data runs out completely or a postamble is detected.

Figure 12:
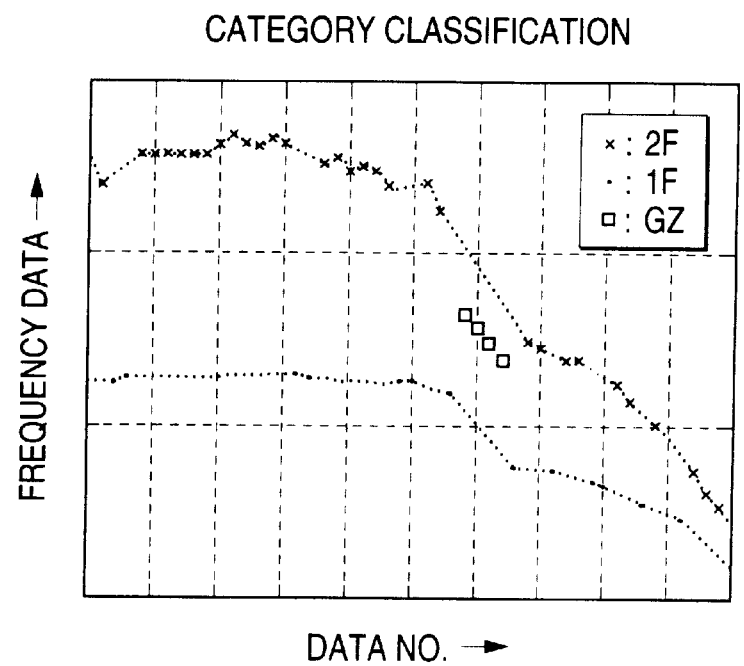
FIG. 12 is a chart to represent frequency curves after category classification.

After all frequency data is classified into the three categories according to the procedure, two frequency curves as shown in FIG. 12 are formed for the "0" data and the "1" data.

Figure 13:
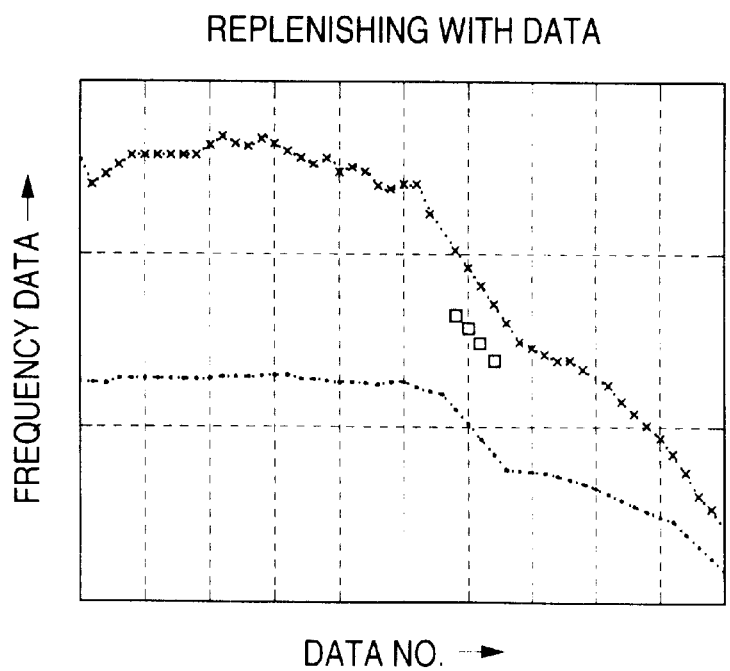
FIG. 13 is a chart after the frequency curves represented in FIG. 12 are replenished with data.
Figure 14:
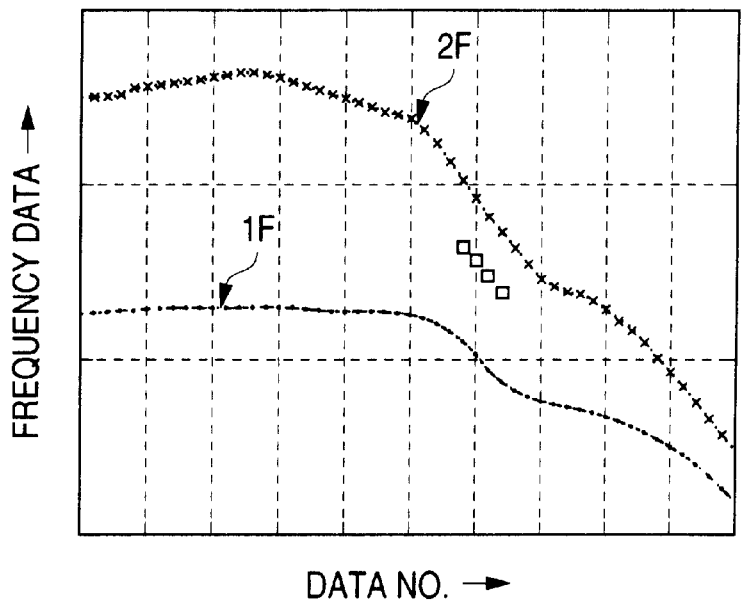
FIG. 14 is a chart to represent frequency curves provided by smoothing the frequency curves represented in FIG. 13.

Next, referring again to FIG. 6, at step S4 in the figure, frequency data is added so that the numbers of data pieces in data areas of magnetic record areas become equal, and the above-mentioned two frequency curves are corrected to those as in FIG. 13. Then, at step S5 in FIG. 6, smoothing processing using a moving average method is performed for providing two frequency curves 1F and 2F corrected as in FIG. 14.

Figure 15:
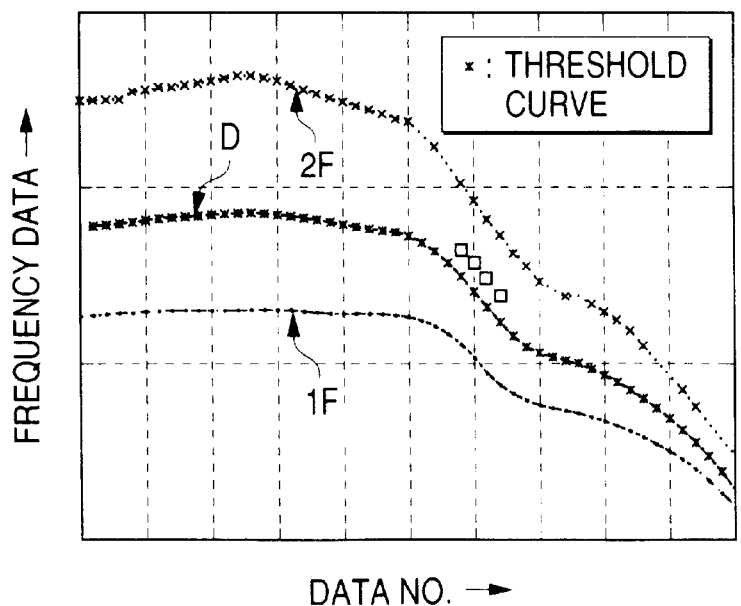
FIG. 15 is a chart to represent a threshold curve found from the frequency curves represented in FIG. 14.
Figure 16:
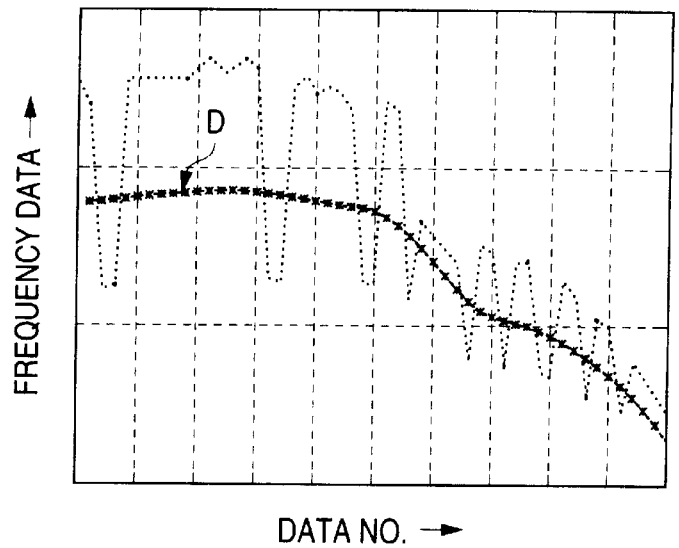
FIG. 16 is a chart to represent a state in which the threshold curve represented in FIG. 15 is set.

Further, at step S6 in FIG. 6, a curve D passing through the middle of the frequency curves corrected for the "0" data (1F) and the "1" data (2F) is found as in FIG. 15. The middle curve D is plotted with the average value of each value resulting from multiplying the "0" data (1F) curve by $(1/\alpha)$ when the bit reference time is $\alpha T$ for determining the "1" data and each value resulting from multiplying the "1" data (2F) curve by $(1/(2\alpha))$ for determining the "0" data. The resultant middle curve D is adopted as a threshold curve for binarization determination and binarization determination is executed for all frequency data as shown in FIG. 16.

In the binarization determination, first the counter is set to 0 at step S7 in FIG. 6, then the frequency data Vi stored in the memory is compared with the threshold value Di corresponding to the frequency data Vi in sequence in less-than, equal-to, or greater-than relation at step S8. If the frequency data Vi falls below the threshold value Di, it is determined "0" at step S9. On the other hand, if the frequency data Vi is the same as or exceeds the threshold value Di, it is determined "1". At this time, the next frequency data Vi+1 is handled at step S10 and the frequency data is compared with the corresponding threshold value in less-than, equal-to, or greater-than relation at step S11. Normally, if the determination result is "1" the next data should also exceed the corresponding threshold value. If so, the frequency data is determined "1" formally at step S12 following step S11; otherwise, it is assumed that a subbit error is detected at step S13, and appropriate error handling is performed, then the process is terminated.

The described determination operation is repeated to steps S14 and S15 until the last frequency data is reached, then the process is terminated.

Thus, in the data demodulation method of the magnetic record data according to the embodiment, the threshold curve D for determining whether the frequency data is "0" data (1F) or "1" data (2F) is found based on all frequency data of the interval data of the whole magnetic record data written to the magnetic card 111 as a magnetic record medium, and data determination is made from the whole of the interval data. Therefore, abnormal data caused by rapid speed fluctuation partially occurring is also determined with good accuracy.

Figure 17:
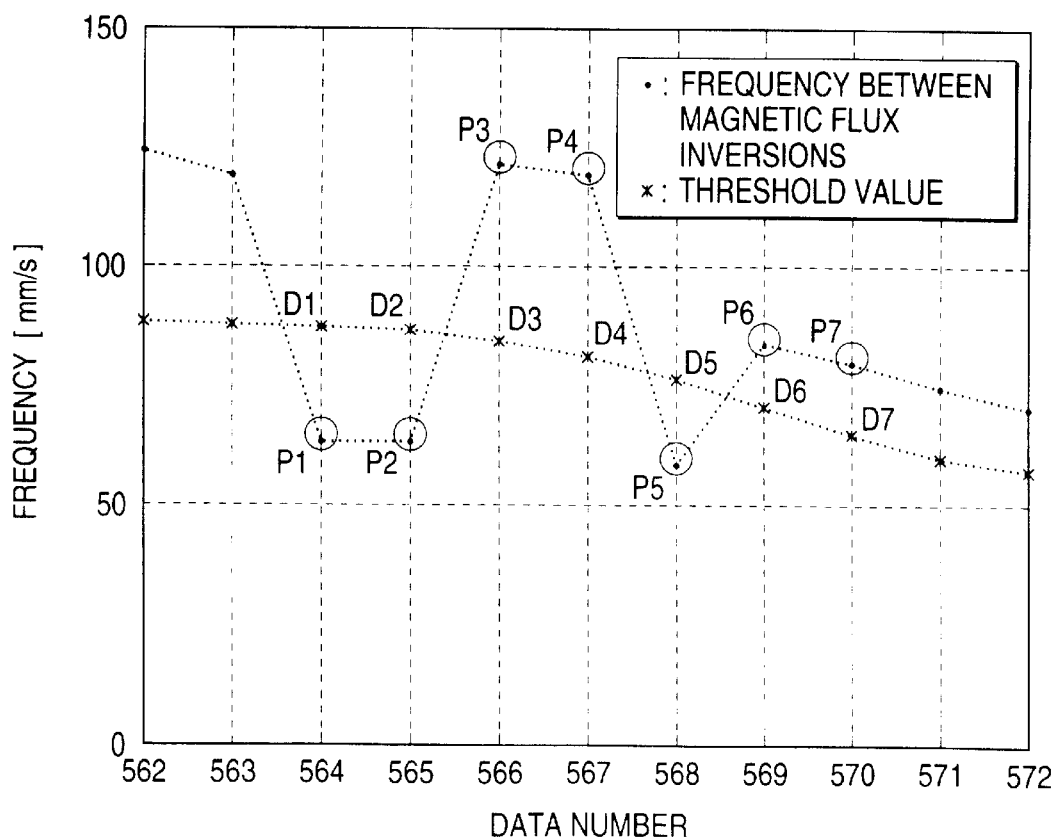
FIG. 17 is a chart to represent magnetic flux inversion frequencies representing a portion where erroneous read occurs in a related art on an enlarged scale.

For example, the range surrounded by the wiggly line in FIG. 10 is the portion in which the transport speed of the magnetic card fluctuates rapidly. The truth values of points P1 to P7 shown in FIG. 17 representing the portion on an enlarged scale are as listed in the following table:

| Magnetic flux inversion No. | P1 | P2 | P3 | P4 | P5 | P6 | P7 |
|---|---|---|---|---|---|---|---|
| Magnetic record frequency | 1F | 1F | 2F | 2F | 1F | 2F | 2F |
| Binary value | '0' | '0' | '1' | | '0' | | '1' |

Figure 39:
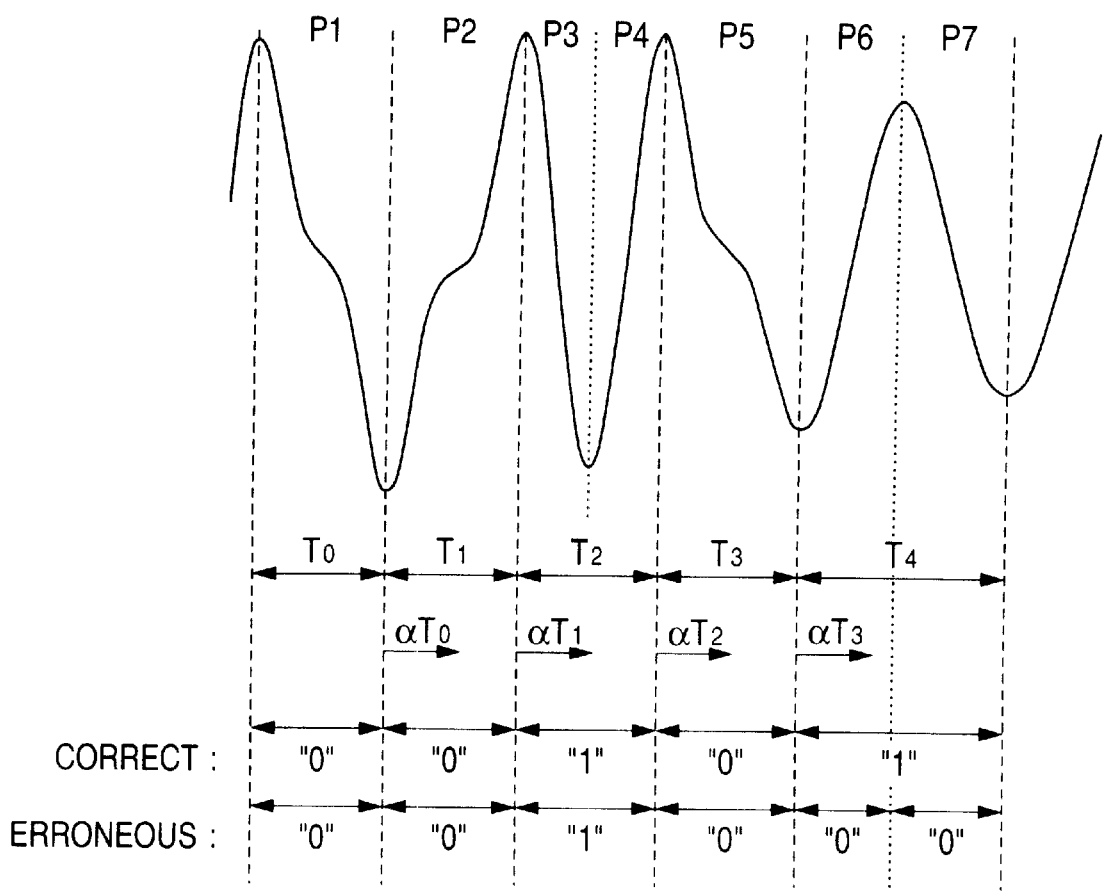
FIG. 39 is a chart to show an example of detecting the presence or absence of inversion of signal polarity according to a bit tracking system.

In the reader in the related art, P6 and P7 are read erroneously as "0" as shown in FIG. 39, but in the described reader according to the embodiment, P1 to P7 are compared with the corresponding threshold values D1 to D7 and demodulation is executed and since P6>D6 and P7>D7, P6 and P7 are read as "1" correctly.

At this time, the data demodulation method of the magnetic record data in the embodiment adopts the frequency of the reciprocal of the magnetic flux inversion time as the interval data, so that the data immediately before the magnetic record medium stops is converged in 0 direction and diverging is prevented.

In the data demodulation method of the magnetic record data in the embodiment, the frequency curves provided by classifying the frequency data into the categories are replenished with data, so that the threshold curve D is provided with good accuracy.

The embodiment of the invention has been described specifically, but the invention is not limited to the embodiment and the combination and arrangement of parts may be resorted without departing from the spirit and the scope of the invention, needless to say.

For example, the magnetic record media according to the invention are not limited to the magnetic cards in the embodiment described above and the invention can also be applied to other various magnetic record media. The magnetic card readers are not limited to those for manually transporting magnetic record media and the invention can also be applied to magnetic card readers using a motor, etc., to automatically transport magnetic record media.

In the data demodulation method of magnetic record data of this embodiment, the threshold curve for determining whether the interval data is "0" data or "1" data is found based on the interval data of the whole magnetic record data written to a magnetic record medium, and data determination is made from the whole of the interval data. Thus, abnormal data caused by rapid speed fluctuation partially occurring is also determined with good accuracy, and if the transport speed of the record medium fluctuates, stable demodulation can be executed according to a simple configuration.

In the data demodulation method of magnetic record data of this embodiment, the frequency of the reciprocal of the magnetic flux inversion time is adopted as the interval data, so that the data immediately before the magnetic record medium stops is converged in 0 direction and diverging is prevented. Thus, the above-described advantage can be provided reliably.

In the data demodulation method of magnetic record data of this embodiment, the frequency curves provided by classifying the data into the categories are replenished with data, so that the threshold curve is provided with good accuracy. Thus, the above-described advantage can be provided more reliably.

Third Embodiment

A third embodiment of the invention for using the invention to read a magnetic card will be discussed in detail with reference to the accompanying drawings.

Figure 18:
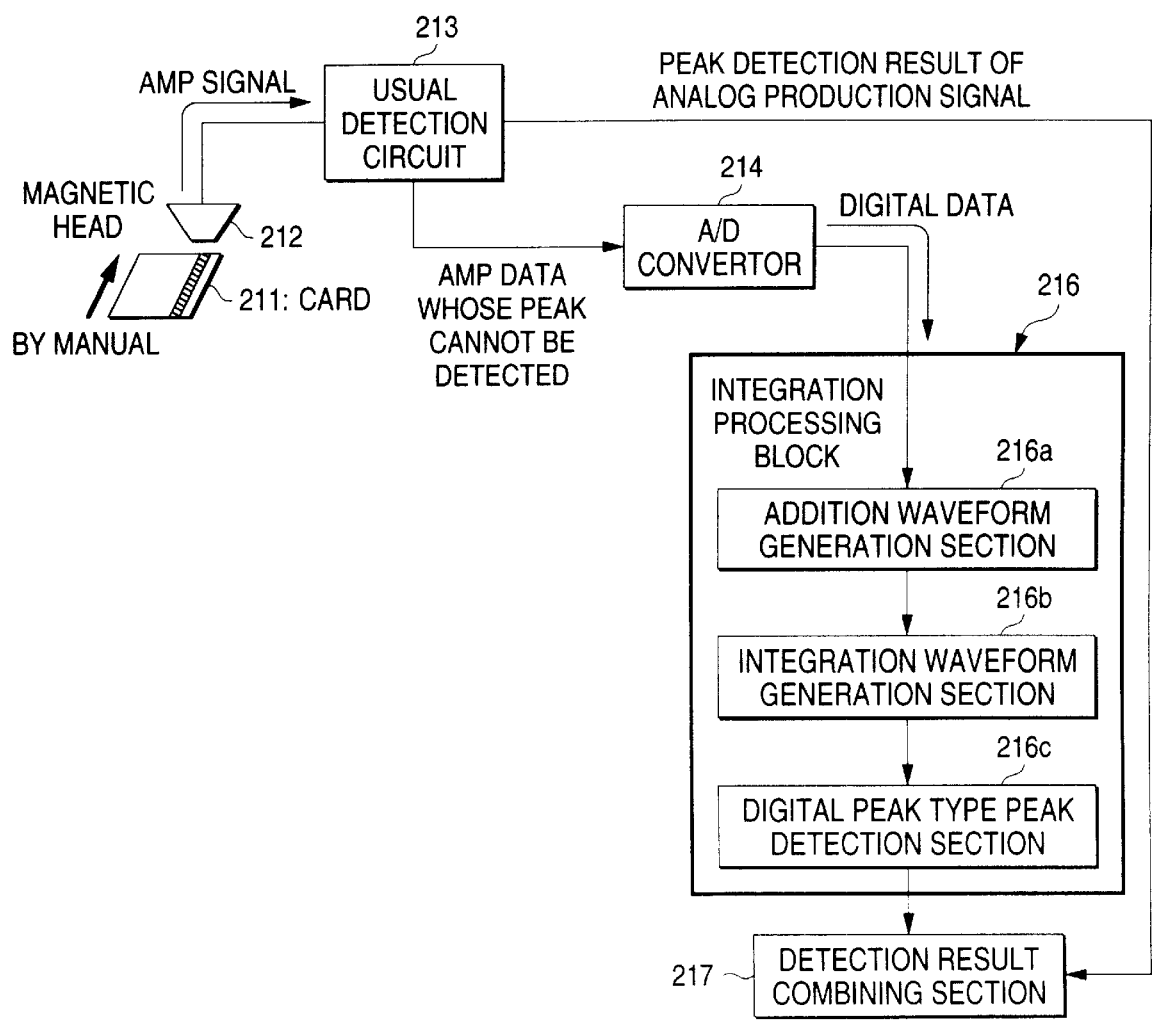
FIG. 18 is a block diagram to represent one embodiment of a data demodulator of magnetic record data according to the invention.
Figure 19:
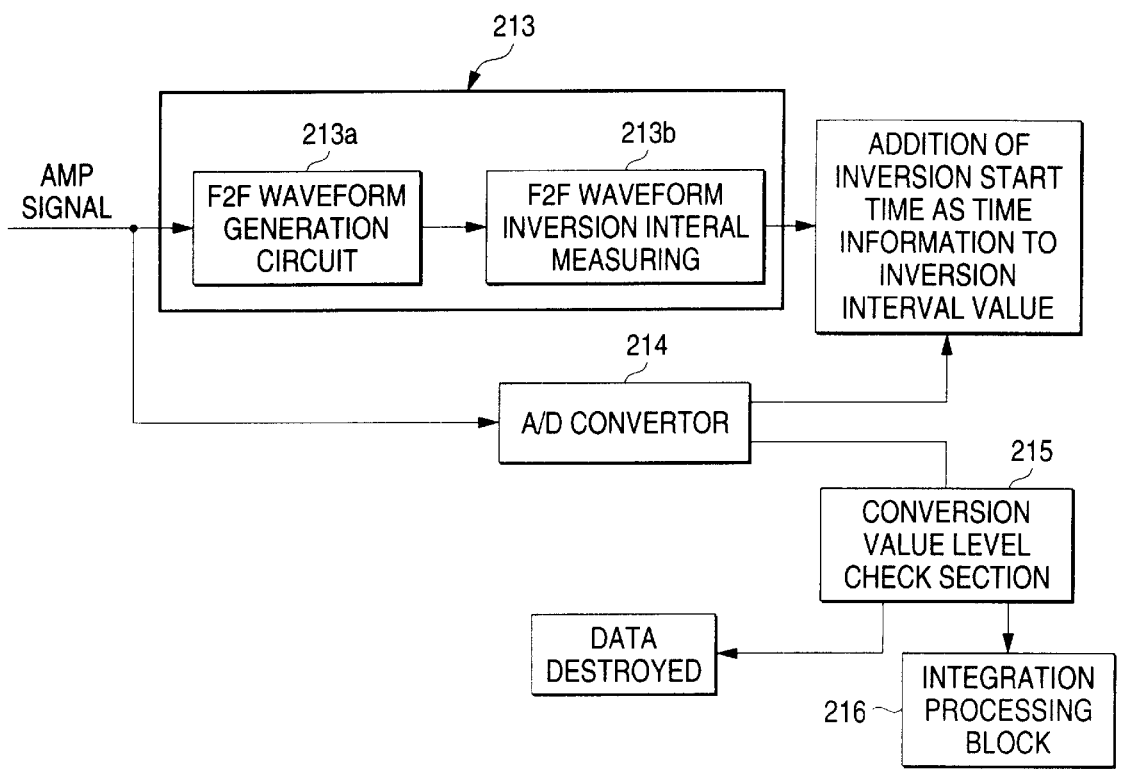
FIG. 19 is a detailed block diagram to represent the A/D conversion portion in the data demodulator shown in FIG. 18.
Figure 38:
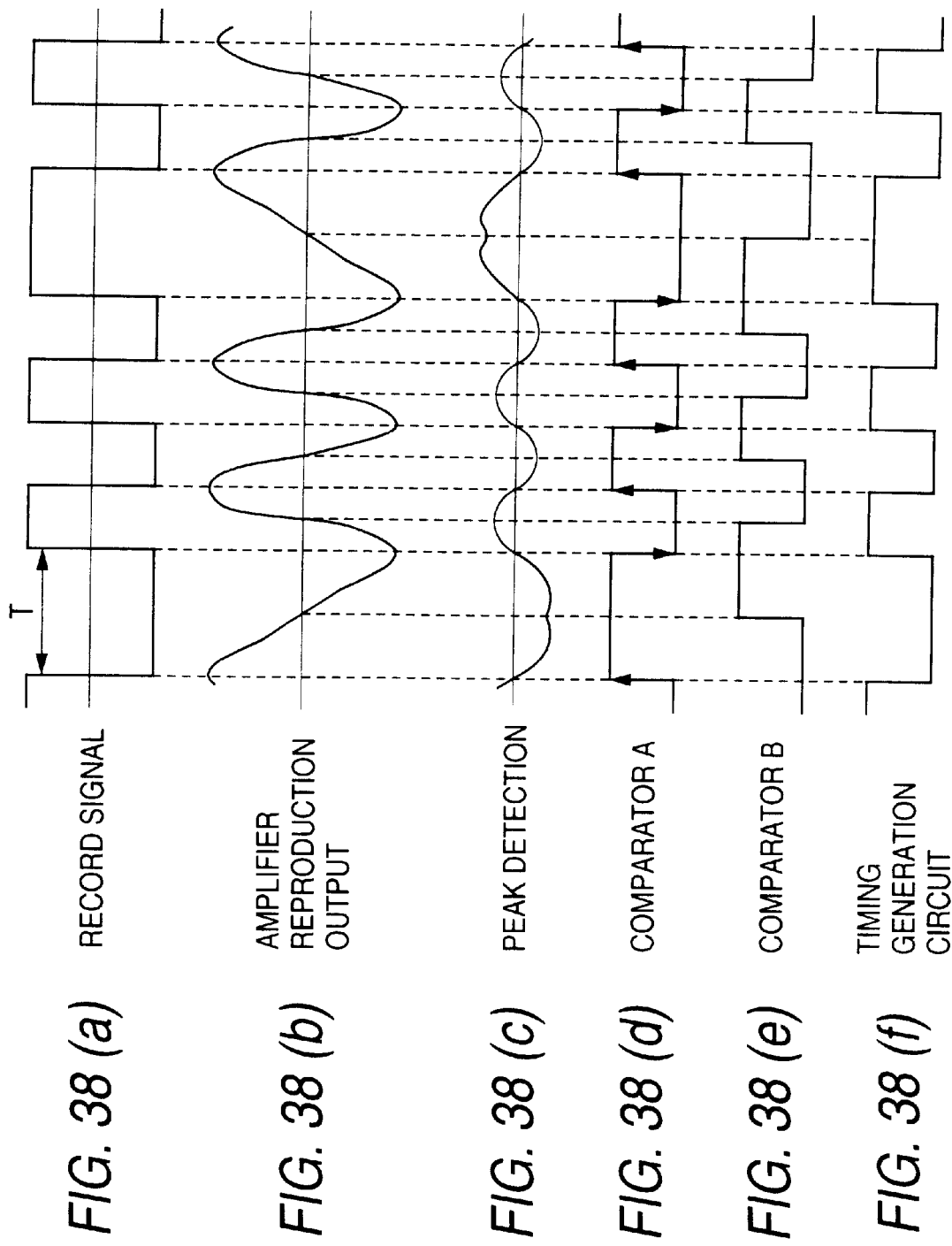
FIG. 38 is a timing chart to show the execution procedure of the data demodulation method of magnetic record data in the related art.

First, as shown in FIG. 18, magnetic record data written to a magnetic card 211 as a magnetic record medium (see FIG. 38(*a*)) is reproduced as an analog signal (AMP signal) by a magnetic head 212 and the analog reproduction signal (AMP reproduction signal) is input to an F2F generation circuit 213*a* and an F2F waveform inversion interval measuring circuit 213*b* placed in a usual peak detection circuit 213 having a similar configuration to that in a related art, also as shown in FIG. 19, and is formed as a peak interval detection signal (see FIG. 38(*f*)) as shown in FIG. 20A.

Figure 20:
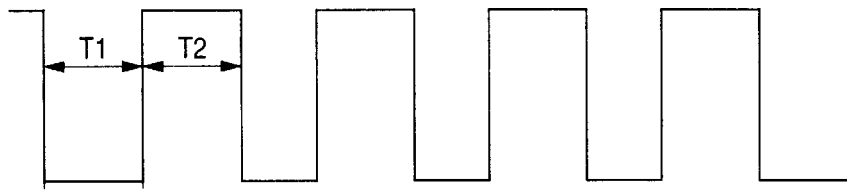
FIGS. 20A and 20B are drawings to represent a peak interval signal numbering state.
Figure 20:
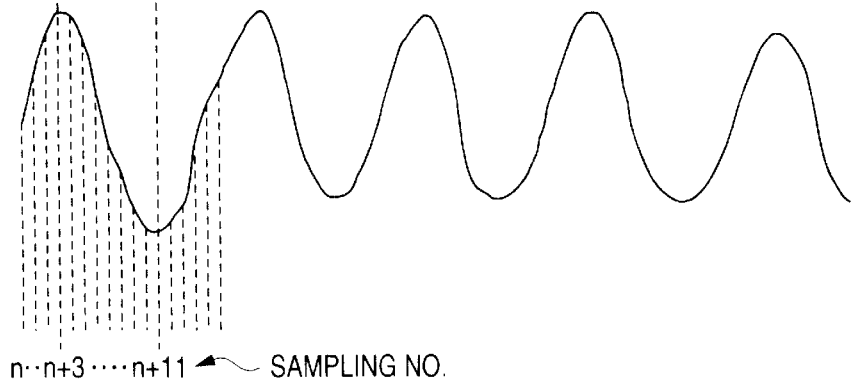

On the other hand, the analog signal (AMP signal) from the magnetic head 212 is input to an A/D converter 214, which then converts the analog signal into digital data (digital reproduction signal) as shown in FIG. 20B. The digital data (digital reproduction signal; see FIG. 20B) is related to the peak interval detection signal (see FIG. 20A) and is given a number for each sampling interval, and the number is used as position information or time information at the combining time described later. In the signal example shown in FIG. 20, sampling number (n+3) in the digital data in FIG. 20B is related to one peak interval value T1 in the peak interval detection signal in FIG. 20A and sampling number (n+11) in the digital data is related to another peak interval value T2 in the peak interval detection signal; the sampling numbers are used as the position or time information.

Further, the digital data (digital reproduction signal) provided by the A/D converter 214 is input to a conversion value level check section 215 shown in FIG. 19 and is compared with a threshold value preset therein. If conversion output at a level exceeding the threshold value is not produced over a given time or more, the digital data (digital reproduction signal) within the time range is output to an integration processing block 216 as described later, which then detects a peak and discards any other digital data. A peak interval detection signal provided by the integration processing block 216 is combined with the peak interval detection signal from the peak detection circuit 213 by a detection result combining section 217 shown in FIG. 18, then the resultant signal is sent to the following processing circuit.

Figure 21:
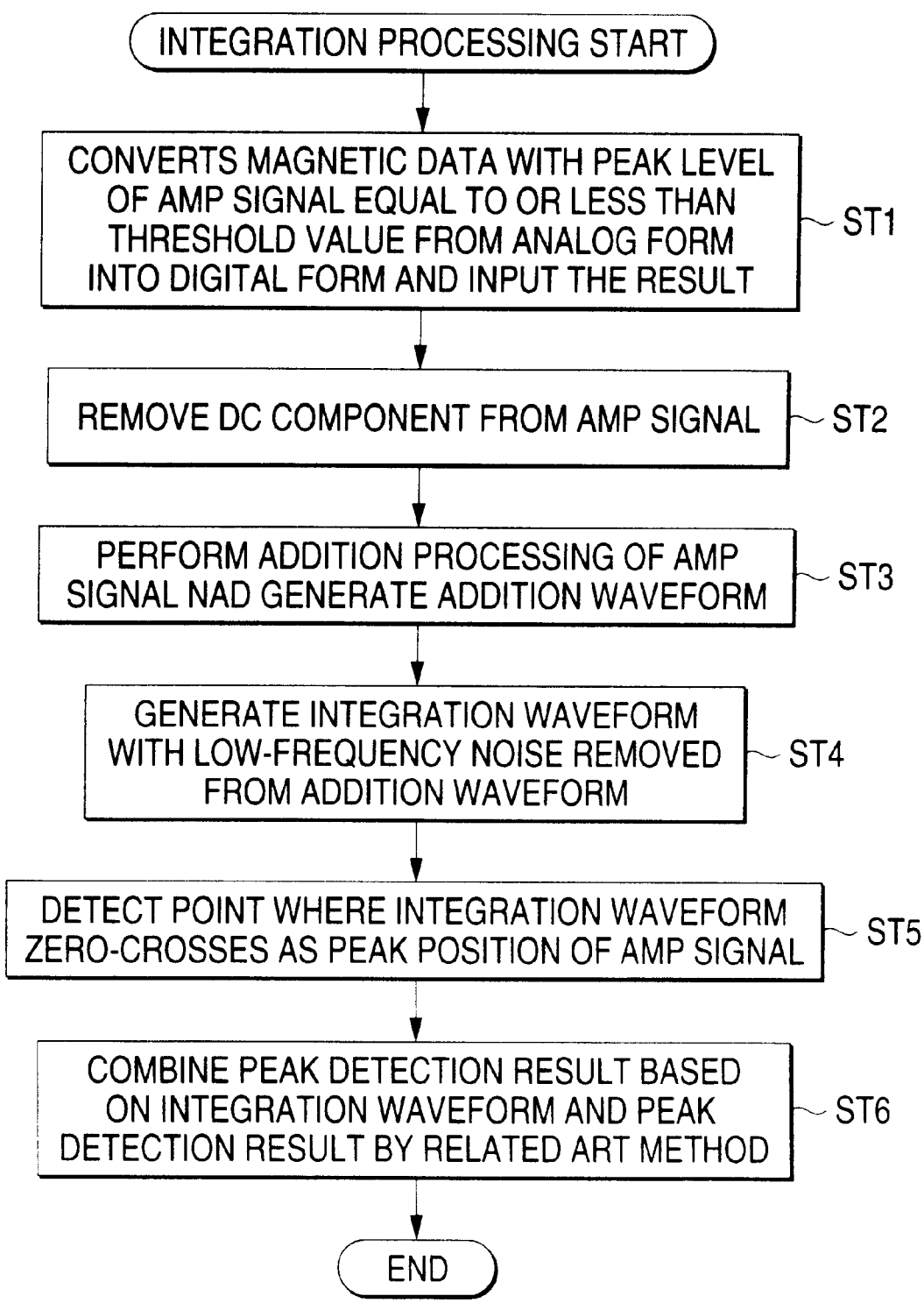
FIG. 21 is a flowchart to represent one embodiment of a data demodulation method of magnetic record data according to the invention.

The integration processing block 216 comprises an addition waveform generation section 216*a*, an integration waveform generation section 216*b*, and a digital peak type peak detection section 216*c* and performs integration processing as shown in FIG. 21 in the sections 216*a*, 216*b*, and 216*c*. That is, in the figure, when integration processing is started, first the digital data within the time range in which conversion output at a level exceeding the threshold value is not produced over a given time or more as described above is input to the addition waveform generation section 216*a* from the A/D converter 214 (step 1 (ST1) in FIG. 21), and a DC component is removed from the digital data (step 2 (ST2) in FIG. 21).

A specific computation procedure applied at this time will be discussed. First, the addition result about An corresponding to the nth one of the digital reproduction signal output from the A/D converter 214 is found based on the total number of samples, N, and DC component DC is found from the addition result as in the following expression:

$$\text{DC component (DC)} = (1/N) \sum_{k=1}^{N} A_k \tag{1}$$

Data an with the DC component DC removed is found according to the following expression:

$$a_n = A_n - DC \tag{2}$$

Figure 22:
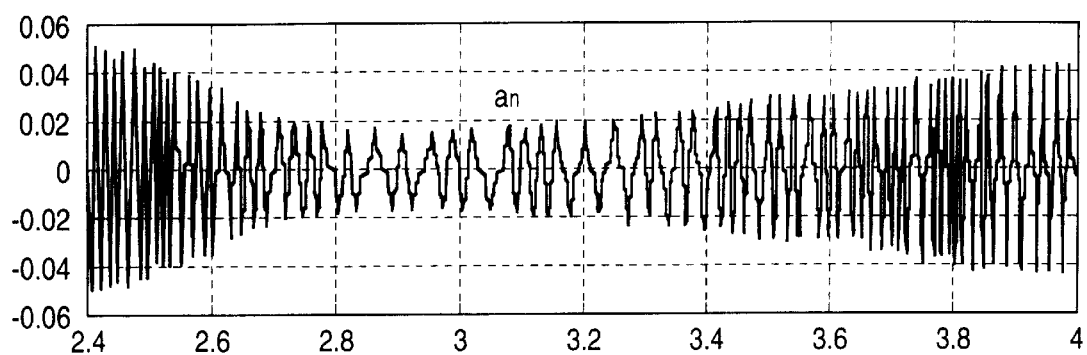
FIG. 22 is a chart to represent a reproduction curve with DC component removed from digital reproduction signal.

A waveform signal of the data an with the DC component DC removed becomes, for example, as shown in FIG. 22. On the horizontal axis in the figure, multiplying by a multiplier of 10 results in the number of samples.

Next, addition processing of the data an with the DC component DC removed is performed and addition waveform In of the digital reproduction signal is found (step 3 (ST3) in FIG. 21). The addition processing is performed according to $$I_n = \sum_{k=1}^{N} a_k \text{ } (n = 1 \text{ to } N \text{ where } N \text{ is the total number of samples}) \tag{3}$$

Figure 23:
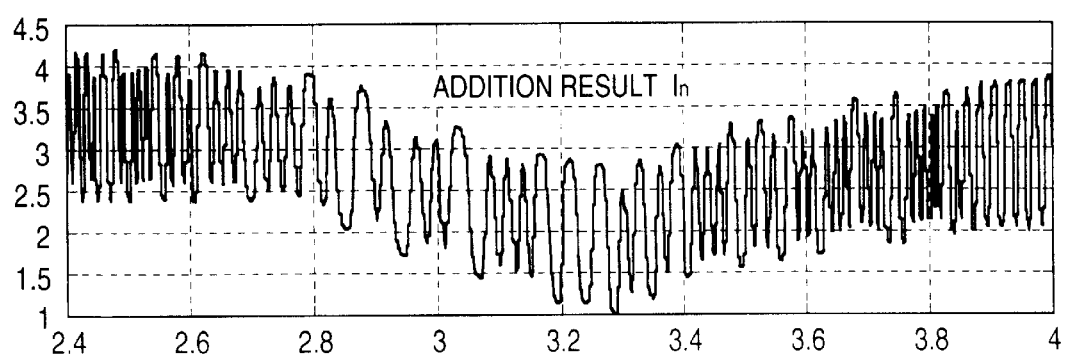
FIG. 23 is a chart to represent the addition result of the reproduction curve shown in FIG. 22.

A signal of a waveform, for example, as shown in FIG. 23 is provided.

Further, the integration waveform generation section 216*b* calculates an integration waveform with low-frequency noise removed from the addition waveform In of the digital reproduction signal (step 4 (ST4) in FIG. 21). At this time, first an envelope EUn on the maximum side and an envelope EDn on the minimum side in the addition waveform In are found and an average line EAn of the envelopes EUn and EDn is calculated according to the following expression:

$$EA_n = (EU_n + ED_n)/2 \tag{4}$$

(n=1 to N where N is the total number of samples)

Figure 24:
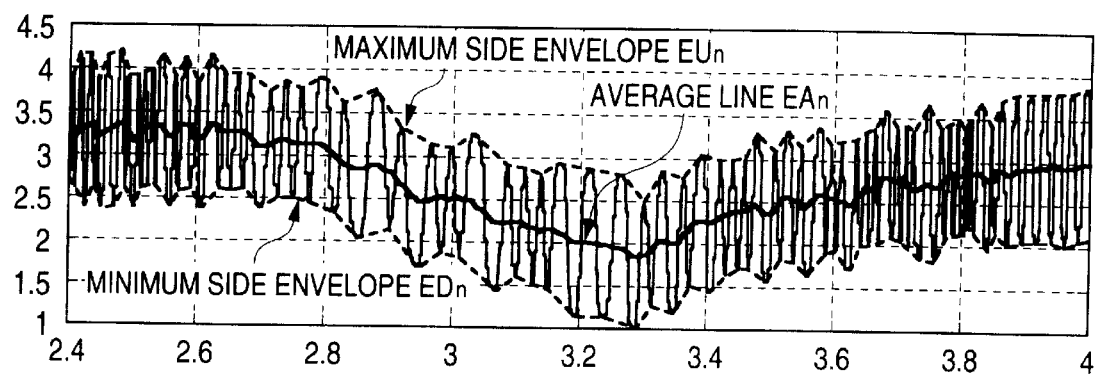
FIG. 24 is a chart to represent envelopes and an average curve of the addition curve shown in FIG. 23.

The curves become waveform signals, for example, as shown in FIG. 24.

Next, integration waveform in with low-frequency noise removed from the average line EAn of the envelopes EUn and EDn is calculated based on $$i_n = I_n - EA_n \tag{5}$$

(n=1 to N where N is the total number of samples)

Figure 25:
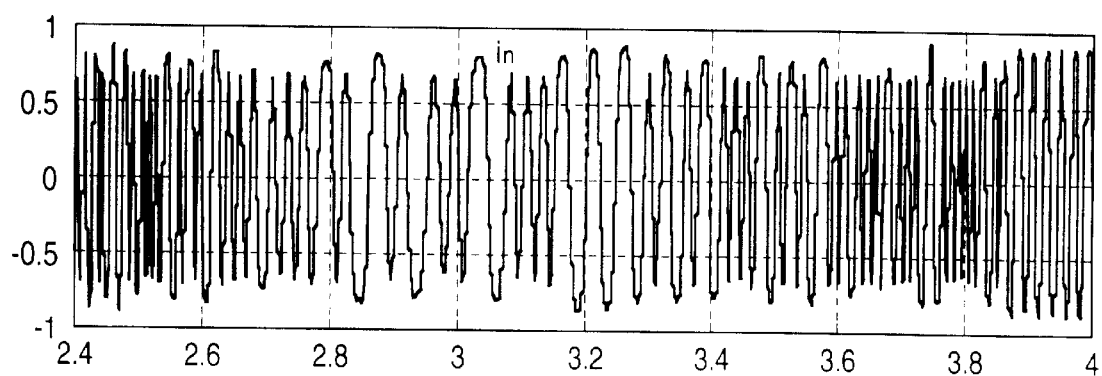
FIG. 25 is a chart to represent the result of subtracting the average curve from the addition curve shown in FIG. 23.

A waveform signal, for example, as shown in FIG. 25 is provided.

At this time, the zero-cross point in the integration waveform in corresponds to the peak position of the original digital reproduction signal, thus the digital type peak detection section 216*c* outputs a peak interval detection signal between the zero-cross points of the integration waveform in (step 5 (ST5) in FIG. 21).

To detect the peak, noise error constant in the "0" vicinity ±α is set considering variations in waveform and if the following expression holds for the error constant ±α, the peak position is detected:

$i_{n-1} \leq 0+\alpha$ and $i_n > 0+\alpha$ or $i_{n-1} \geq 0-\alpha$ and $i_n < 0-\alpha$ Last, the peak interval detection signal made of the integration waveform provided as described above and the peak interval detection signal from the peak detection circuit 213 having the usual configuration described above are combined (step 6 (ST6) in FIG. 21), and the integration processing terminates.

Thus, in the embodiment, peak detection is executed as a detectable level by using the signal provided by integrating the digitized reproduction signal, so that if the passage speed of a magnetic record medium such as a magnetic card becomes low and formerly it would be made impossible to detect a peak, good peak detection is accomplished.

In the embodiment, in the integration calculation, low-frequency signal is not cut across the board and only low-frequency noise is removed based on the average value provided using the envelopes, etc., of the integration result and thus peak detection particularly when the peak interval is largely widened is well executed.

Further, in the embodiment, processing is performed concerning only the signal in the undetectable range in the related art method, so that the whole peak detection time is shortened. Further, the envelopes of integration curves are used to calculate an average value, so that it is made possible to perform speedier computation processing and the whole processing speed is increased.

In addition, in the embodiment, the digital type peak detection section 216c detects zero-cross point of the average integration waveform output from the integration waveform generation section 216b and executes peak detection, so that processing is performed speedily and precisely. In the embodiment, the conversion value level check section 215 detects the level of a digital reproduction signal and sends the digital reproduction signal corresponding to the range in which the level is less than the threshold value over the given time to the addition waveform generation section 216a of the integration processing section 216, whereby processing is performed concerning only the signal in the undetectable range in the related art method, so that the whole peak detection time is shortened all the more.

Further, in the embodiment, the means for adding position information or time information to the signal in the range the level is less than the threshold value in the digital reproduction signal is provided, so that the position information or the time information can be used to combine the peak detection result based on the analog reproduction signal and the peak detection result based on the digital reproduction signal speedily and precisely.

The embodiment of the invention has been described specifically, but the invention is not limited to the embodiment and the combination and arrangement of parts may be resorted without departing from the spirit and the scope of the invention, needless to say.

For example, in the described embodiment, the average line EAn of the addition waveform In used for providing the integration waveform with low-frequency noise removed from the addition waveform In of the digital reproduction signal is found by calculating the envelopes EUn and EDn of the addition waveform In. However, the envelopes need not necessarily be found; various computation methods such that an average value of the adjacent maximum and minimum points is found to form an average line, for example, can be adopted.

In the embodiment, the zero-cross point in the integration waveform in is detected as the peak position, but the peak position can also be detected under other various conditions in such a manner that a point with the largest inclination is detected.

For example, a configuration can also be adopted wherein a differentiation type peak detection section for detecting the peak position of a digital reproduction signal through a differentiation circuit is provided and the peak position is detected based on the signals from both the differentiation type peak detection section and the above-described digital type peak detection section in the embodiment. In this case, the conversion value level check section monitors all the time the level of the digital reproduction signal input through the A/D conversion section and when the reproduction signal level is more than a predetermined value, the peak position detection signal from the differentiation type peak detection section is used and when the reproduction signal level is less than the predetermined value, the peak position detection signal from the digital type peak detection section is used. Then, the detection result combining section can combine the peak position detection signal provided by the differentiation type peak detection section and the peak position detection signal provided by the digital type peak detection section.

If the peak position of the digital reproduction signal is thus detected based on the signals from both the differentiation type peak detection section comprising the differentiation circuit and the digital type peak detection section, speedier processing can be carried out. Particularly, if the differentiation type peak detection section and the digital type peak detection section are switched for use in response to the signal level, it is made possible to perform speedy and high-accuracy processing for wider-range signal level.

In the present embodiment, peak detection is executed as a detectable level by adopting the signal provided by integrating the digitized reproduction signal, and if the passage speed of a magnetic record medium such as a magnetic card becomes low and formerly it would be made impossible to detect a peak, good peak detection is accomplished. Thus, the magnetic record media can be demodulated stably and the reliability of the data demodulation method and the demodulator of magnetic record data can be enhanced.

In the present embodiment, only low-frequency noise is removed from the integration calculation result based on the average value, whereby peak detection particularly when the peak interval is largely widened is well executed. Thus, the magnetic record media can be demodulated stably all the more.

In this embodiment, the maximum and minimum values on integration curves are used and the maximum side and minimum side envelopes are used to find an average value of the integration curve, so that the average value is calculated speedily and the whole processing speed can be increased in addition to the above-mentioned advantages.

In this embodiment, a zero-cross point on the average integration curve is detected as a peak position in the reproduction signal of the digital data for performing speedy and precise processing, so that the whole processing speed can be increased all the more in addition to the above-mentioned advantages.

On the other hand, in this embodiment, the level of the digital reproduction signal is detected and processing is performed concerning only the signal in the undetectable range in the related art method, whereby the whole peak detection time is shortened, so that the whole processing speed can be more increased in addition to the above-mentioned advantages.

In the data demodulator of magnetic record data of this embodiment, position information or time information is added to a digital reproduction signal producing small output and the peak detection result based on the analog reproduction signal and the peak detection result based on the digital reproduction signal are combined speedily and precisely using the position information or the time information, so that the above-mentioned advantages can be more enhanced.

Further, in this embodiment, the peak position is detected based on the signals from both the differentiation type peak detection section and the digital type peak detection section and they are used together, whereby it is made possible to perform speedy processing. Thus, the processing speed can be more increased.

Further, in this embodiment, the differentiation type peak detection section and the digital type peak detection section are switched for use in response to the level of the digital reproduction signal input through the A/D conversion section, and it is made possible to perform speedy and high-accuracy processing for wider-range signal level. Thus, the above-mentioned advantages can be more enhanced.

Fourth Embodiment

A fourth embodiment of the invention for using the invention to read a magnetic card will be discussed in detail with reference to the accompanying drawings.

Figure 26:
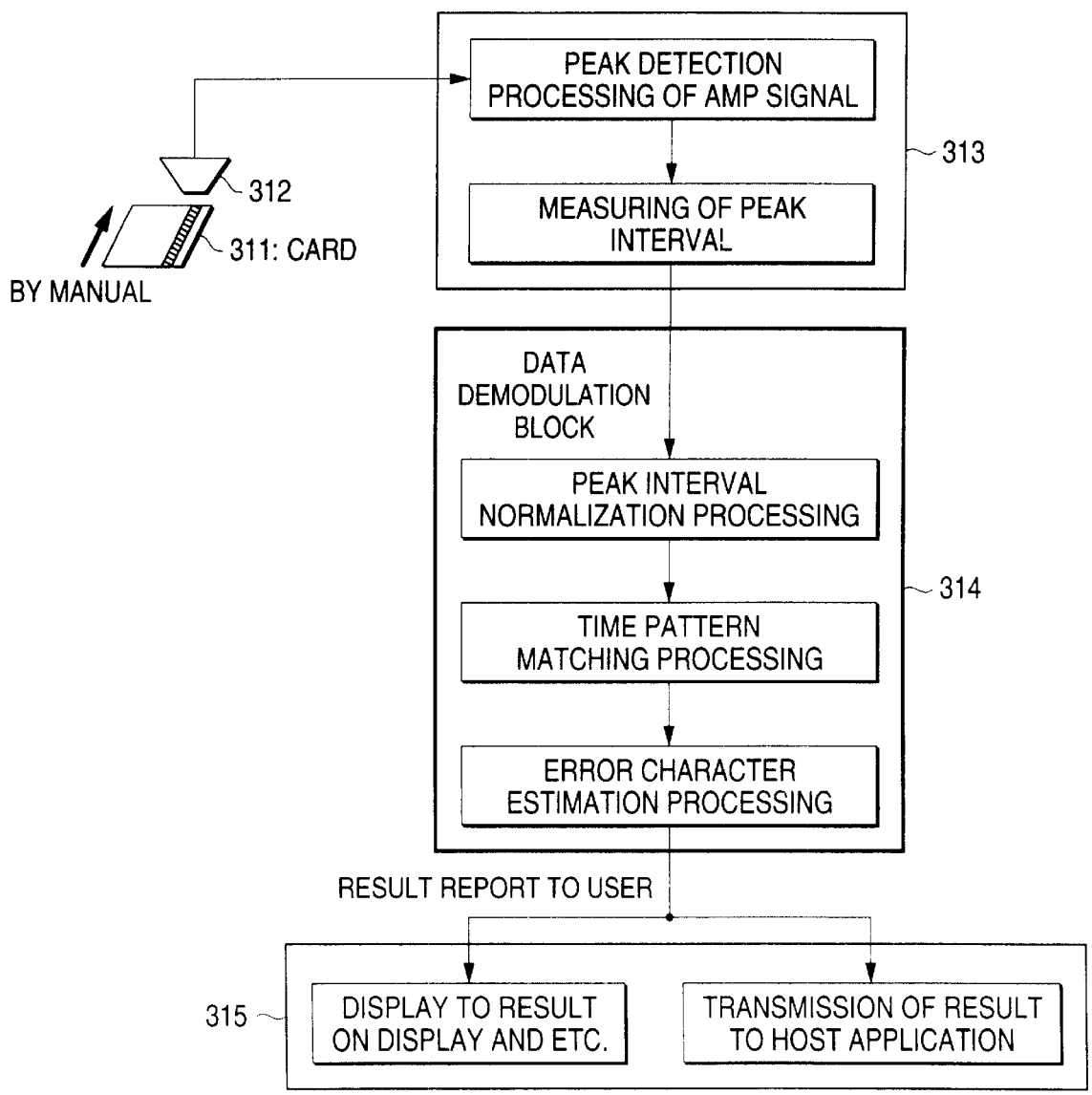
FIG. 26 is a block diagram to represent one embodiment of a data demodulator of magnetic record data according to the invention.

First, as shown in FIG. 26, magnetic record data written to a magnetic card 311 as a magnetic record medium (see FIG. 38(a)) is reproduced as an analog signal (AMP signal) as a relative move of the magnetic card 311 to a magnetic head 312 is made when the magnetic card 311 is transported manually or automatically in a run passage (not shown). The analog reproduction signal (AMP reproduction signal) is input to an F2F generation circuit and an F2F waveform inversion interval measuring circuit placed in a usual peak detection section 313 having a similar configuration to that in the related art, the interval between the adjacent peak positions is measured, and a provided peak interval detection signal (see FIG. 38(f)) is output.

The analog reproduction signal (AMP reproduction signal) thus provided is input to a data demodulation section 314 and is demodulated into magnetic data information consisting of "0" and "1" signals. The magnetic data information is displayed on the outside or is transmitted to the outside in an appropriate data use section 315.

The data demodulation section 314 performs peak interval normalization processing, time pattern matching processing, and error character estimation processing according to the invention in sequence. First, one embodiment of the peak interval normalization processing according to the invention will be discussed.

Figure 27:
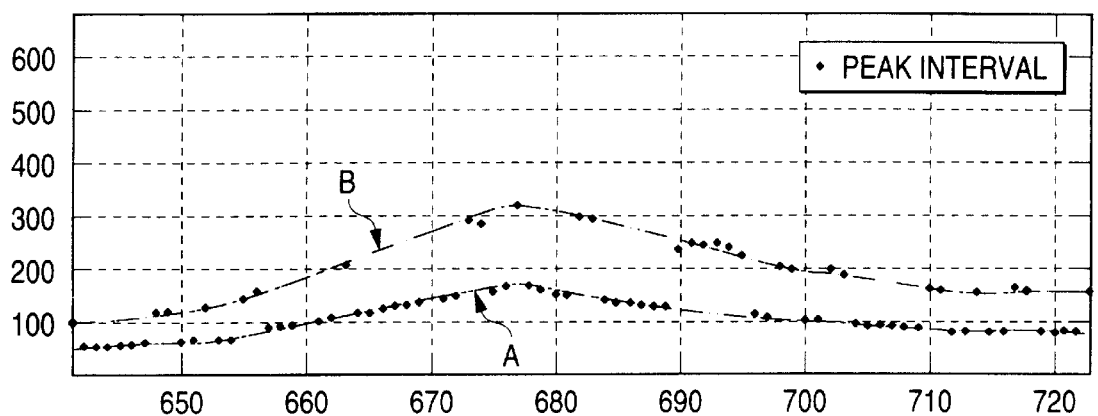
FIG. 27 is a chart to represent one example of a progression distribution of detected peak intervals.

The analog reproduction signal (AMP reproduction signal) of the magnetic record data (see FIG. 38(a)) presents a peak interval progression distribution, for example, as shown in FIG. 27. The peak interval progression distribution is provided by plotting the peak interval values (the vertical axis in FIG. 27) corresponding to acquired data numbers (on the horizontal axis in FIG. 27) in the order of the data numbers. A narrow peak interval curve A of a set of narrow peak intervals forming "1" signals and a wide peak interval curve B of a set of wide peak intervals forming "0" signals are found from the peak interval progression distribution. For easy understanding of the description, the narrow and wide interval curves A and B are once found in the description; in fact, however, the following processing is performed using discontinuous data pieces without finding the curve A or B:

In the embodiment, data is formed of frequencies of F and 2F and thus basically a wide peak interval becomes twice a narrow peak interval; one wide peak interval represents a "0" signal and two narrow peak intervals represent a "1" signal. At this time, the peak interval values making up the narrow peak interval curve A and the wide peak interval curve B involve variations corresponding to speed fluctuations at the moving time of the magnetic card 311 described above, and a fluctuation amount progression distribution as represented in the figure is provided corresponding to such speed fluctuations.

Figure 28:
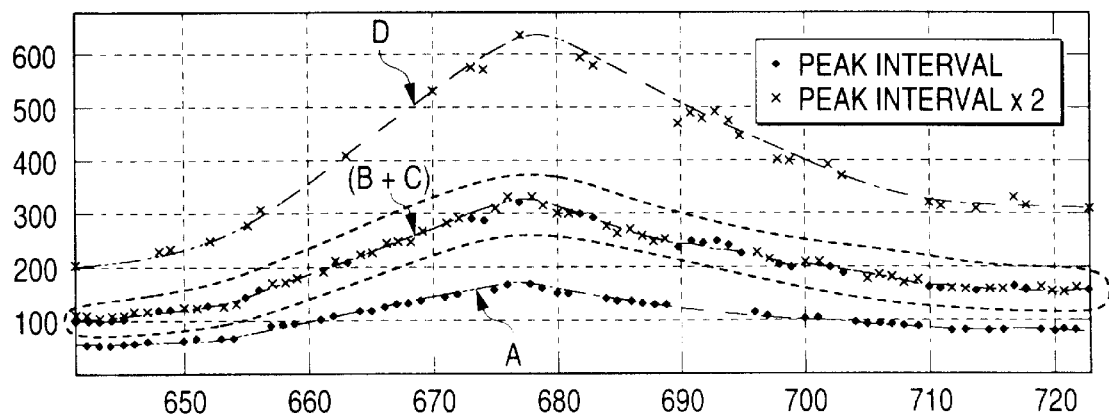
FIG. 28 is a chart to represent a state in which peak interval curves in FIG. 27 are multiplied by two.

Next, data normalization processing is performed using the peak interval values making up the narrow peak interval curve A and the wide peak interval curve B having the fluctuation amount progression distribution of the peak intervals. To perform the data normalization processing, first as shown in FIG. 28, each of the peak interval values making up both the peak interval curves A and B is multiplied by the magnification of the peak interval of each point on the wide peak interval curve B to the peak interval value of each of the points making up the narrow peak interval curve A, namely, in the embodiment, two, whereby multiple computation values indicated by X marks in the figure are found.

For easy understanding of the description, a narrow peak interval multiple curve C and a wide peak interval multiple curve D are found based on the multiple computation values; in fact, however, the following processing is performed using discontinuous data pieces without finding the curve C or D: The multiple computation values making up the narrow peak interval multiple curve C are superposed on the peak interval values making up the wide peak interval curve B, thereby forming a continuous curve (B+C). In short, the continuous curve (B+C) may be formed as a result and the curves B, C, etc., need not previously be found.

Figure 29:
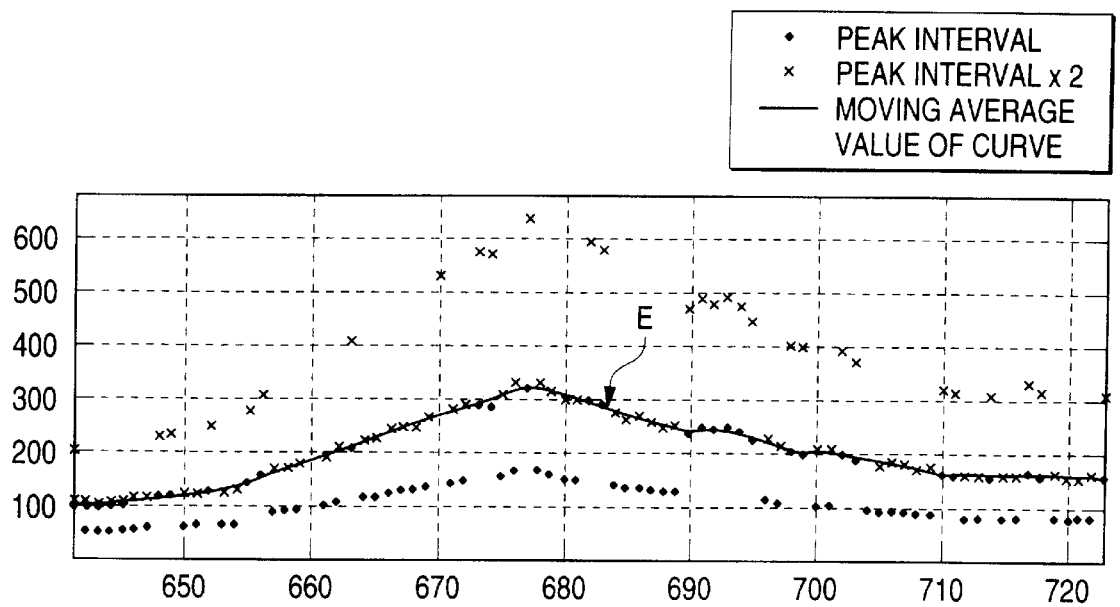
FIG. 29 is a chart to represent a moving average curve of the peak interval curves in FIG. 28.

Next, a moving average of the peak interval values at the points forming the continuous curve (B+C) thus provided is found. In the embodiment, a total of five average values (each two preceding and following the center point of the computation) are calculated, thereby finding the moving average value, and a moving average curve E as shown in FIG. 29 is provided as the computation result. The moving average curve E is a distribution curve representing the fluctuation amounts of the peak intervals on the original narrow peak interval curve A and wide peak interval curve B.

Figure 30:
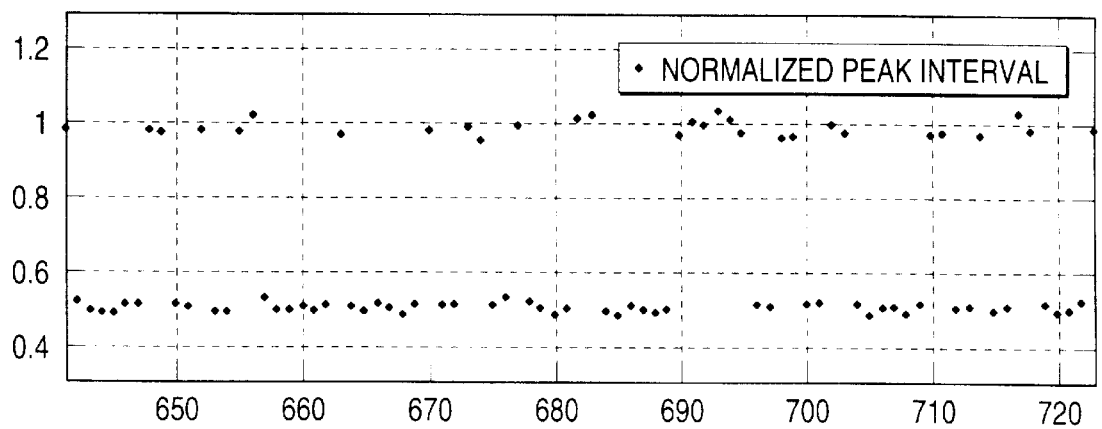
FIG. 30 is a chart to represent a state in which the original peak interval progression distribution is normalized based on the moving average curve of the peak interval curves in FIG. 29.

Therefore, the peak interval values at the points on the original narrow peak interval curve A and wide peak interval curve B are divided by the values at the points on the moving average curve E, whereby a normalized peak interval progression distribution as shown in FIG. 30 is provided. That is, the value of each of the points making up the normalized progression distribution is "1" or "0.5" representing the peak interval of the magnetic record data written onto the magnetic card 311 described above or is a value extremely close to that value, and the values can be used to provide a good reproduction state.

Thus, in the embodiment, normalization processing is performed for the data of the detected original peak intervals, whereby the speed fluctuation component of the magnetic card 311 is removed from the detection data of the original peak intervals, and magnetic data information is demodulated precisely based on the normalized peak interval data. The normalization processing is not limited to that "multiplying by two" and such processing fitted to any other criterion can also be adopted.

Further, in the embodiment, the normalization processing is performed by multiple calculation concerning narrow peak intervals and wide peak intervals, so that computation concerning the normalization processing can be performed speedily and precisely. At this time, in the embodiment, the multiple calculation in the normalization processing can be easily set using the magnification of the peak intervals and to perform the normalization processing, the moving average of the peak interval values is used, so that more precise computation can be performed using the peak interval values canceling the variations and extremely good modulation can also be performed for the magnetic card 311 whose move speed easily fluctuates or which easily stops.

After the data demodulation section 314 thus performs the peak interval normalization processing, time pattern matching processing using various characters including letters of A, B, C, etc., provided in the reader is performed based on the normalized peak interval data, whereby the peak interval data is read and estimation processing of an erroneous character is performed for estimating the character based on peak interval data that cannot be read. The error character estimation processing will be discussed.

First, when peak interval sequences as shown in FIG. 31 exist, character delimiters of the peak interval sequences exist as shown in the figure, the peak interval sequence in a section A represents character "N" (0111011), and the peak interval sequence in a section B represents character "E" (1010010). The peak interval existing at the left end in FIG. 31 in each of the sections is the top peak interval. The number of the peak intervals contained in each character varies from one character to another (12 peak intervals contained in the character "N" and 10 peak intervals contained in the character "E"). Thus, unless the immediately preceding character is determined, the top peak interval of the following character is not known. That is, in the case in FIG. 31, if demodulation in the section A results in failure and an error character state is entered, it is made impossible to determine which peak interval corresponds to the peak interval at the top of the following section. In such a case, the number of peak intervals in the above-described error character is determined by performing processing according to a flow shown below in FIG. 34.

FIG. 33 in which the peak interval sequences shown in FIG. 32 are plotted shows the result of reading characters "7," "8," and "9" into sections A, B, and C respectively in FIG. 33. It is assumed that the error character occurs in the section A, for example, because the magnetic card stops while the peak interval corresponding to the number "76" in the section A is being read and thus the peak interval corresponding to the number is not normally normalized.

Figure 34:
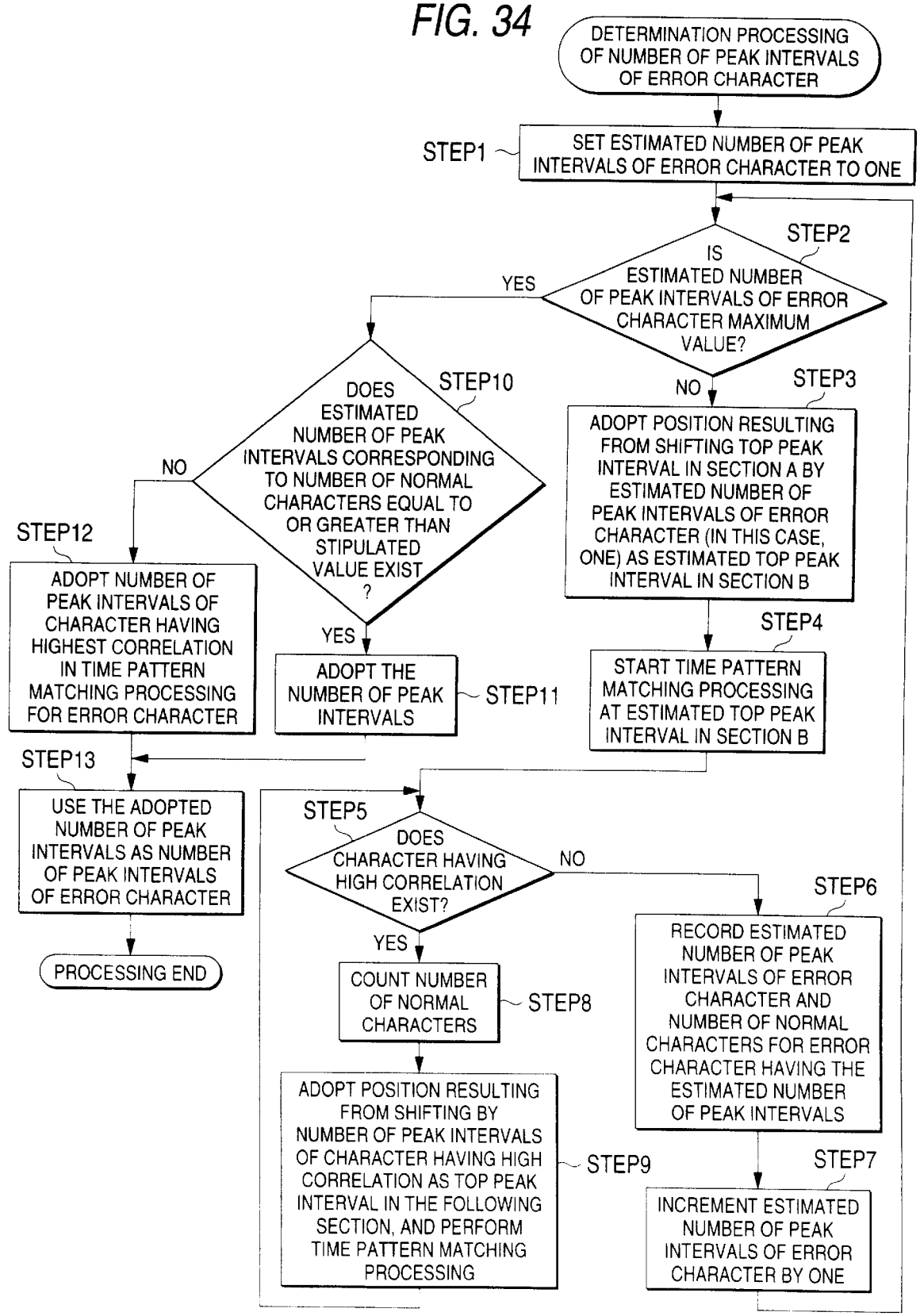
FIG. 34 is a flowchart to represent a determination processing procedure of the number of peak intervals of an error character.
Figure 35:
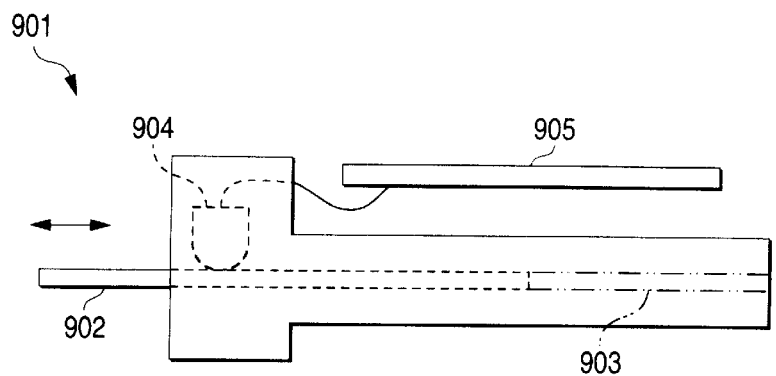
FIG. 35 is a drawing to show a magnetic card reader for reading a magnetic card in a related art.
Figure 36:
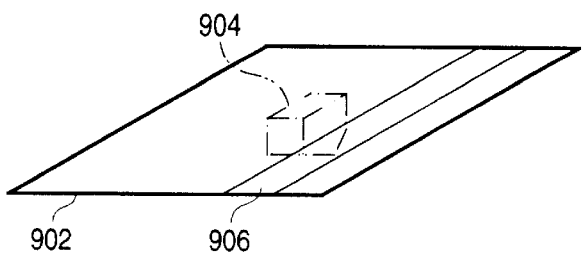
FIG. 36 is a drawing to show the magnetic card reader for reading a magnetic card in the related art.
Figure 37:
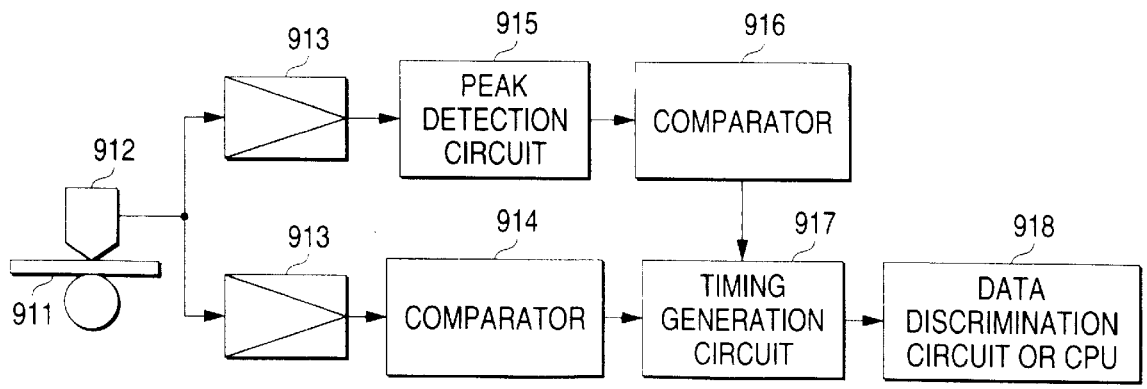
FIG. 37 is a block diagram to show an apparatus example for executing a data demodulation method of magnetic record data in a related art.

In this case, error character estimation processing as shown in FIG. 34 is performed for the error character occurs in the section A, and the top peak interval in the following section B is found.

First, at STEP 1 in FIG. 34, the estimated number of peak intervals of the error character is set to 1. At this stage, the estimated number of peak intervals of the error character at STEP 2 does not reach the maximum value and thus control goes to STEP 3 at which peak interval number "75" resulting from shifting the number "74" of the top peak interval in the section A by the estimated number of peak intervals, 1, is adopted as the top peak interval in the section B.

At STEP 4, time pattern matching processing is performed starting at the peak interval number "75" and if a character having a high correlation cannot be found at STEP 5 as a result of the time pattern matching processing, control goes to STEP 6 and the estimated number of peak intervals, 1, and the number of normal characters, 0, are recorded.

At STEP 7, the estimated number of peak intervals of the error character is set to 2, then control returns through STEP 2 to STEP 3 and the top peak interval in the section B is set to the peak interval number "76." The time pattern matching processing at STEP 4 is again performed at the position.

If a character having a high correlation cannot be found at STEP 5 as a result of the time pattern matching processing, control goes to STEP 6 and the estimated number of peak intervals, 2, and the number of normal characters, 0, are recorded. The time pattern matching processing is repeated while the estimated number of peak intervals is incremented by one and the top peak interval in the section B is shifted in order.

If the maximum number of normal characters is one although the time pattern matching processing is repeated until the estimated number of peak intervals becomes, for example, 7, the estimated number of peak intervals is set to, 8, and the top peak interval in the section B is set to peak interval number "82." As a result of performing the time pattern matching processing starting at the position, if a character having a high correlation like the section B or C can be found at STEP 5 and again becomes an error character or continues to the position of a postamble, control goes to STEP 8 at which the number of normal characters having the estimated number of peak intervals, 8, is counted and the number of characters having a high correlation that can be found is set.

Next, at STEP 9, the estimated number of peak intervals is again incremented by one starting at, 9, and a similar check is made until the maximum value 12 (the maximum number of peak intervals of character on track 2+2). At the termination of checking in all numbers of peak intervals, control again returns to STEP 2 and the number of normal characters in one number of peak intervals is compared with that in another. If the number of normal characters is the maximum, control goes to STEP 10 and the number of peak intervals corresponding to the number of normal characters equal to or greater than a stipulated value is found. In the example, the number of peak intervals, 8, is applied. Then, at STEP 11, the number of peak intervals of the error character is determined 8.

If the number of peak intervals corresponding to the number of normal characters equal to or greater than the stipulated value does not exist, the number of peak intervals of the character having the highest correlation is adopted at STEP 12 and the adopted number of peak intervals is used as the number of peak intervals of the error character at STEP 13, then the processing is terminated.

The embodiment of the invention has been described specifically, but the invention is not limited to the embodiment and the combination and arrangement of parts may be resorted without departing from the spirit and the scope of the invention, needless to say.

In the data demodulation method of magnetic record data of this embodiment, the original detection data of the peak intervals is normalized, whereby the fluctuation component is removed from the original detection data of the peak intervals, and magnetic data information is precisely demodulated based on the normalized data. Thus, if the transport speed of a magnetic record medium rapidly changes or the magnetic record medium stops, speedy and precise demodulation can be executed according to a simple configuration and the reliability of data demodulation can be enhanced.

In the data demodulation method of magnetic record data of this embodiment, normalization is executed by performing multiple calculation concerning narrow and wide peak intervals, whereby it is made possible to perform computation concerning the normalization speedily and precisely, so that the above-mentioned advantages can be more enhanced.

In the data demodulation method of magnetic record data of this embodiment, it is made possible to easily set multiple calculation in normalization based on the magnification between the peak intervals. Thus, computation concerning the normalization can be performed more speedily and precisely, and the above-mentioned advantages can be enhanced all the more.

Further, in the data demodulation method of magnetic record data of this embodiment, to normalize the peak interval progression distribution, the moving average of the peak interval values is used, whereby it is made possible to perform precise computation with the peak interval values canceling the variations. Thus, computation concerning the normalization can be performed more speedily and precisely, and the above-mentioned advantages can be more enhanced.

On the other hand, in the data demodulation method of magnetic record data of this embodiment, the invention is applied to a magnetic card whose move speed easily fluctuates; particularly noticeable advantages can be provided.

What is claimed is:

1. A data demodulation method of magnetic record data for demodulating magnetic data information made of "0" signal or "1" signal based on interval data provided by detecting a peak position in a reproduction signal of magnetic record data written to a magnetic record medium and counting the time interval between the adjacent peak positions, said data demodulation method comprising the steps of:

classifying all interval data concerning the peak positions of the reproduction signal into three categories of "0" data, "1" data, and "gray zone" data undefined as the "0" data or the "1" data;

performing smoothing processing for the categories of the "0" data and the "1" data, thereby finding two smoothed curves;

averaging the two smoothed curves, thereby finding and setting a threshold curve for classifying data into the "0" data and the "1" data; and making binarization determination of all the interval data using the setup threshold curve.

2. The data demodulation method of magnetic record data as claimed in claim 1, wherein to classify the interval data concerning the peak positions of the reproduction signal into the three categories, magnetic flux inversion time Tk for each magnetic domain is adopted as the interval data, a change rate between magnetic flux inversion times Tk−1 and Tk in the adjacent magnetic domains, Tk/Tk−1, is found, and the change rate Tk/Tk−1 is compared with a reference value, whereby the interval data is classified into the three categories.

3. The data demodulation method of magnetic record data as claimed in claim 2, wherein to find the change rate Tk/Tk−1 between the magnetic flux inversion times Tk−1 and Tk, a change rate in frequencies Vk−1 and Vk of reciprocals 1/Tk−1 and 1/Tk of the magnetic flux inversion times Tk−1 and Tk, Vk−1/Vk, is found and the change rate Vk−1/Vk in the frequencies Vk−1 and Vk is compared with a reference value, whereby the interval data is classified into the three categories.

4. The data demodulation method of magnetic record data as claimed in claim 3, wherein two frequency curves corresponding to the "0" data and the "1" data are found by classifying the interval data into the three categories and smoothing processing is performed for the two frequency curves, whereby two smoothed curves are found.

5. The data demodulation method of magnetic record data as claimed in claim 4, wherein two frequency curves corresponding to the "0" data and the "1" data are found by classifying the interval data into the three categories, replenishment processing is performed so that the numbers of data pieces in the two frequency curves become almost the same, and smoothing processing using a moving average method is performed for the two frequency curves undergoing the replenishment processing, whereby two smoothed curves are found.

* * * * *